United States Patent
Eppink et al.

(10) Patent No.: US 6,598,687 B2
(45) Date of Patent: Jul. 29, 2003

(54) THREE DIMENSIONAL STEERABLE SYSTEM

(75) Inventors: Jay M. Eppink, Spring, TX (US); Albert C. Odell, II, Kingwood, TX (US); James W. Estep, Houston, TX (US); James B. Terry, Houston, TX (US); Thomas Platt Wilson, Houston, TX (US); William F. Trainor, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/820,163

(22) Filed: Mar. 28, 2001

(65) Prior Publication Data

US 2001/0052427 A1 Dec. 20, 2001

Related U.S. Application Data

(60) Division of application No. 09/467,588, filed on Dec. 20, 1999, which is a division of application No. 09/081,961, which is a continuation-in-part of application No. 09/081,961, filed on May 20, 1998, now Pat. No. 6,296,066.
(60) Provisional application No. 60/063,326, filed on Oct. 27, 1997.

(51) Int. Cl.$^7$ .............................. E21B 7/08; F16D 1/02
(52) U.S. Cl. ........................ 175/73; 175/74; 175/320; 464/19
(58) Field of Search .............. 175/73, 74, 76, 175/320; 464/18, 19, 106, 155, 20, 21, 906

(56) References Cited

U.S. PATENT DOCUMENTS

| 3,713,500 A | 1/1973 | Russell | 175/73 |
|---|---|---|---|
| 3,799,277 A | 3/1974 | Kellner | 175/94 |
| 3,888,319 A | 6/1975 | Bourne, Jr. et al. | 175/76 |
| 3,995,889 A | * 12/1976 | Carr et al. | 285/91 |
| 4,040,494 A | 8/1977 | Kellner | 175/45 |
| 4,336,415 A | 6/1982 | Walling | 174/47 |
| 4,394,881 A | 7/1983 | Shirley | 175/76 |
| 4,463,814 A | 8/1984 | Horstmeyer et al. | 175/45 |
| 4,471,843 A | 9/1984 | Jones, Jr. et al. | 175/73 |
| 4,568,145 A | 2/1986 | Colin et al. | 350/96.2 |

(List continued on next page.)

FOREIGN PATENT DOCUMENTS

| GB | 2 042 609 A | 11/1979 | 175/73 |
|---|---|---|---|
| GB | 2172324 | * 9/1986 | 175/76 |
| GB | 2 233 363 A | 1/1991 | 175/73 X |
| GB | 2246151 | * 1/1992 | |

*Primary Examiner*—Heather Shackelford
*Assistant Examiner*—Jong-Suk Lee
(74) *Attorney, Agent, or Firm*—Conley Rose, P.C.

(57) ABSTRACT

A steering assembly includes upper and lower tubular housings connected by a universal joint. An angle cam is disposed on the end of the lower housing and projects into the upper housing. A plurality of wedge members extend axially from the upper housing and into engagement with the angle cam. Drive trains are connected to the wedge members to move the wedge members toward and away from the angle cam so as to pivot the lower housing at the universal joint and change the angle and azimuth of the lower housing with respect to the upper housing. The lower housing is connected to a bearing pack supporting a drill bit such that upon changing the angle and azimuth of the lower housing, the direction of the drilling of the drill bit is also changed. The steering assembly being connected to composite tubing having conductors in the wall thereof for conducting data and commands between the steering assembly and a processor at the surface and for providing power to the steering assembly. Data on the position of the bit is transmitted to a processor which determines the direction of drilling and selectively transmits commands to the steering assembly to change the bend angle and direction of the drilling of the bit.

43 Claims, 24 Drawing Sheets

U.S. PATENT DOCUMENTS

| | | | |
|---|---|---|---|
| 4,854,397 A | 8/1989 | Warren et al. | 175/26 |
| 4,880,066 A * | 11/1989 | Steiginga et al. | 175/76 X |
| 4,904,228 A * | 2/1990 | Frear et al. | 464/29 X |
| 5,050,692 A | 9/1991 | Beimgraben | 175/61 |
| 5,113,953 A * | 5/1992 | Noble | 175/61 |
| 5,139,094 A | 8/1992 | Prevedel et al. | 175/61 |
| 5,165,491 A | 11/1992 | Wilson | 175/62 |
| 5,220,963 A | 6/1993 | Patton | 175/24 |
| 5,269,385 A | 12/1993 | Sihlis | 175/74 |
| 5,314,032 A | 5/1994 | Pringle et al. | 175/74 |
| 5,316,094 A | 5/1994 | Pringle et al. | 175/230 |
| 5,332,048 A | 7/1994 | Underwood et al. | 175/61 |
| 5,373,898 A | 12/1994 | Pringle et al. | 166/72 |
| 5,394,951 A | 3/1995 | Pringle et al. | 175/61 |
| 5,467,834 A | 11/1995 | Hughes et al. | 175/61 |
| 5,485,889 A | 1/1996 | Gray | 175/61 |
| 5,503,235 A | 4/1996 | Falgout, Sr. | 175/61 |
| 5,520,256 A * | 5/1996 | Eddison | 175/73 X |
| 5,542,482 A | 8/1996 | Eddison | 175/61 |
| 5,662,180 A * | 9/1997 | Coffman et al. | 175/57 |
| 5,738,178 A | 4/1998 | Williams et al. | 175/61 |
| 5,778,992 A | 7/1998 | Fuller | 175/73 |
| 5,842,149 A | 11/1998 | Harrell et al. | 702/9 |
| 5,875,859 A * | 3/1999 | Ikeda et al. | 175/73 |
| 5,913,337 A | 6/1999 | Williams et al. | 138/125 |
| 5,934,383 A | 8/1999 | Jurgens et al. | 173/91 |
| 6,047,784 A | 4/2000 | Dorel | 175/61 |
| 6,092,610 A | 7/2000 | Kosmala et al. | 175/61 |
| 6,158,533 A * | 12/2000 | Gillis et al. | 175/73 X |
| 6,267,185 B1 | 7/2001 | Mougel et al. | 175/57 |
| 6,328,119 B1 * | 12/2001 | Gillis et al. | 175/325.1 |
| 6,415,878 B1 * | 7/2002 | Cargill et al. | 175/73 X |

* cited by examiner

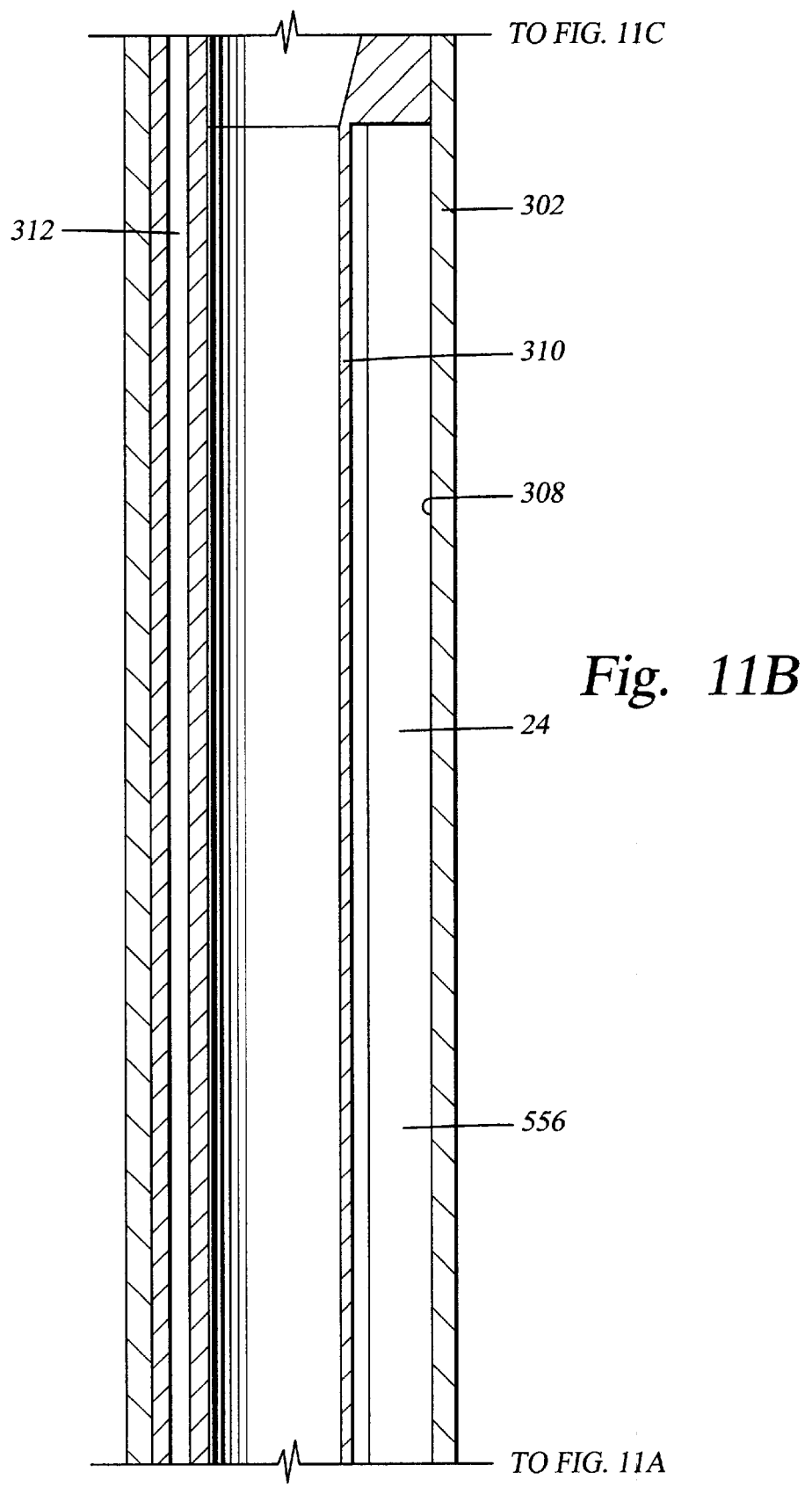

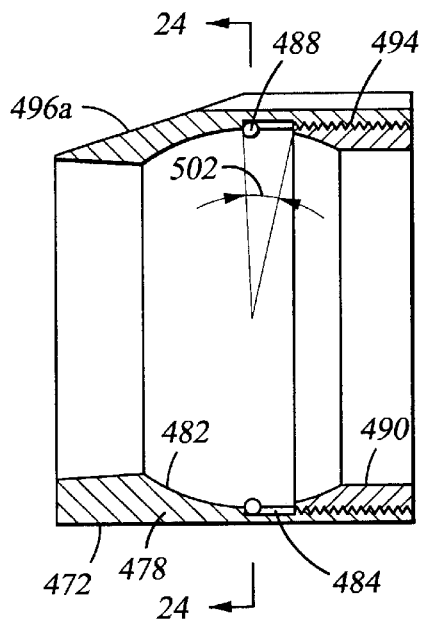
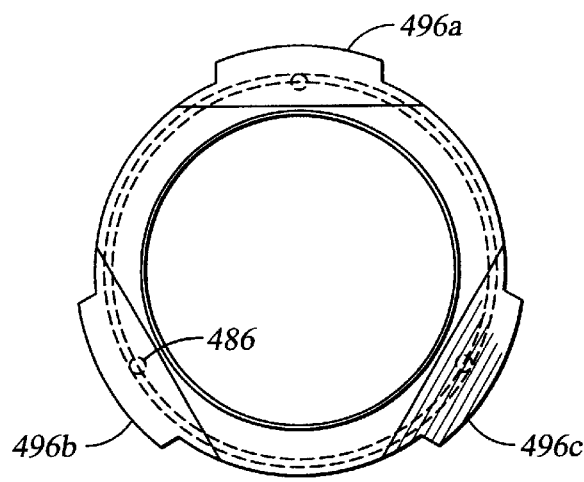
Fig. 23          Fig. 24
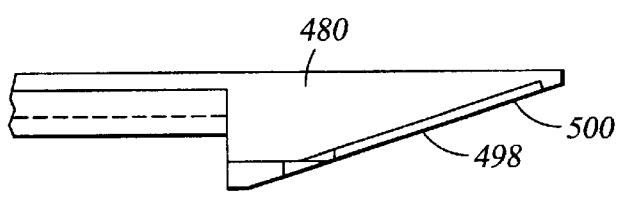
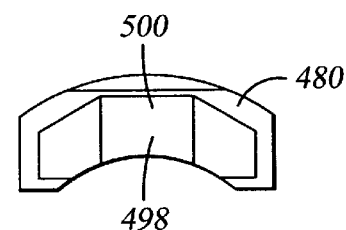
Fig. 25          Fig. 26
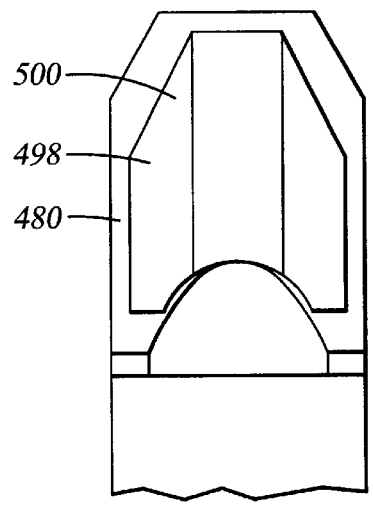
Fig. 27

THREE DIMENSIONAL STEERABLE SYSTEM

CROSS-REFERENCE TO RELATED APPLICATION

The present application is a divisional continuing application of pending U.S. patent application Ser. No. 09/467,588, filed Dec. 20, 1999, hereby incorporated herein by reference, which claims the benefit of 35 U.S.C. 119(e) U.S. provisional application Serial No. 60/063,326, filed Oct. 27, 1997 and entitled Drilling System and is a divisional and continuation-in-part of U.S. patent application Ser. No. 09/081,961 filed May 20, 1998 and entitled Drilling System, both hereby incorporated herein by reference.

BACKGROUND OF THE INVENTION

The present invention relates to apparatus and methods for controlling the direction of drilling of a borehole in a well and more particularly to a steering system for directing three dimensionally the drilling of a bit and still more particularly to a steering assembly with electric power from the surface and communication to and from the surface and which can change bend angle and the direction while drilling.

The conventional practice for drilling a borehole in a well in a controlled direction requires multiple mechanisms to control the direction while drilling. A common prior art tool for controlling the direction of drilling is a bottom hole assembly consisting of the drill bit, stabilizers, drill collars, heavy weight pipe, and a positive displacement motor (mud motor) having a bent housing. The bottom hole assembly is connected to a drill string or drill pipe extending to the surface. The assembly steers by sliding (not rotating) the assembly with the bend in the bent housing in a specific direction to cause a change in the borehole direction. The assembly and drill string are rotated to drill straight.

Another type of prior art tool steers using non-rotating stabilizers, located some distance above the drill bit, to push radially against the side of the borehole with a force, usually constant, so that the bit will drill in the opposite direction at a controlled rate while drilling ahead so that the direction of the hole is altered. This type of steering tool can change direction at a maximum rate of about fifteen degrees per hundred feet of hole drilled and must be run with a rotary drill string or below a mud motor. One such system uses valves and hydraulic fluid to extend adjustable blades engaging the borehole wall to change direction.

Still another prior art steering tool steers using paddles located some distance above the bit. The paddles push of the side of the borehole in a specific direction as the bottom hole assembly rotates in the hole in order to alter the direction of the borehole. This type of steering tool can change direction at a maximum rate of about ten degrees per hundred feet of hole drilled and must be run with a rotary drill string or below a mud motor.

A further prior art steering tool includes a housing with a ball joint and adjustable blades adjacent the ball joint and bit whereby the extension of the blades causes the downhole portion of the housing to bend at the ball joint with respect to the remainder of the bottom hole assembly. Steerable systems, which contact the wall of the borehole to change bend angle or direction, create an undesirable drag against the borehole wall while drilling. This requires additional drilling force on the bit to overcome this drag. Such contact also inhibits the sliding of the bottom hole assembly within the borehole while drilling.

Another method includes a steerable system having wedges, which are actuated by a pressure differential extending the length of the drill string, against cams to drive them out to change drilling direction. Drilling must be stopped to change drilling angle.

The prior art also includes electrically controlled bent subs. These, however, only control the bend in one plane of the tool. Further, the prior art electrically controlled bent subs can not control the direction of the bend without rotating the drill string.

Although various prior art steerable systems can vary bend angle downhole, few can vary both bend angle and direction. None of the prior art tools control both the angle of the bend and the direction of the bend while drilling. Often it is necessary to pull the entire bottom hole assembly out of the hole to change the angle or the direction of the bend.

There are prior art systems which provide electrical power and hydraulics from the surface using an umbilical mounted on the outside of steel coiled tubing. However, such systems do not provide power to the downhole tool directly from the surface through the wall of the coiled tubing.

The present invention overcomes the deficiencies of the prior art.

SUMMARY OF THE INVENTION

The steering assembly of the present invention includes a lower housing mounted on an upper housing by a universal joint allowing the lower housing to bend as much as four degrees in any direction. The steering assembly also includes a control mechanism that controls both the angle and direction of the lower housing with respect to the upper housing while under drilling load. Power to the assembly can be provided directly from the surface and the control mechanism can be controlled remotely from the surface. The steering assembly typically is a part of a bottom hole assembly which includes a drilling motor having a power section above the steering assembly and a bearing pack below the steering assembly with a drive shaft extending through the steering assembly between the power section and the bearing pack. A drill bit is connected to the end of the drive shaft.

The universal joint is a constant velocity joint having a knuckle ball connected to the lower housing and mounted within a cage on the upper housing, the ball being a part of a sleeve that connects to the housing of the bearing pack below and has bearings that are captured between the cage and ball by slots and grooves. The universal joint prevents relative rotation between the motor power section and bearing pack.

The control mechanism includes an angle cam that can be attached to or is part of the knuckle ball on the universal joint. The angle cam projects into the upper housing opposite the bearing pack and drill bit. When the universal joint is rotated so that the bearing pack and drill bit move to an angle and offset, the angle cam moves in the opposite direction to the same angle magnitude and to an offset. The angle cam is adjusted by three wedge members equally spaced apart around the circumference of the inside diameter of the upper housing. The wedge members have a tapered surface that makes contact with a radiused surface on the angle cam so that when all of the wedge members contact the angle cam, its position is secured by the axial locations of each of the three wedge members. The angle of contact between the wedge members and the angle cam can be greater or less than a locking taper although a non-locking taper is preferred and is generally 15° or more. The three wedge members are disposed within a wedge body and are disposed between the upper housing on the outside and one or more sleeves on the inside. Each wedge member is attached to a drive train. One type of drive train includes one or more hydraulic pistons that move axially inside hydraulic cylinders formed for each piston in the wedge body. The hydraulic pistons and cylinders for each wedge member are a part of a hydraulic amplifier which is a hydraulic force multiplier that increases the force applied to the wedge members from that applied to the upper end of the drive train. The hydraulic amplifier uses one or more hydraulic smaller pistons and cylinders that have an overall area less than the larger pistons and cylinders attached to the wedge member. The smaller piston is attached to a threaded screw that is threaded to a nut disposed inside the wedge body such that the axial position of the threaded rod relative to the wedge body and thus the smaller piston can be changed by rotating the screw. The opposite end of the threaded screw is connected to an expandable/contractible member with a sliding splined connection. The other end of the expandable/contractible member is attached to an electric motor drive shaft. The sliding splined connection includes mating splines which transmit torque while also allowing axial movement. The three electric motors are fixed in position within the upper housing so that they are prevented from movement within the upper housing. The wedge body is also fixed within the upper housing so that there is no movement therebetween. The position of the angle cam is thus controlled by turning on and off each electric motor so that the drive shaft rotates the threaded screw which in turn moves the smaller piston. The movement of the smaller piston causes the larger pistons to move axially due to the hydraulic pressure applied within the cylinder so that the wedge member moves axially either towards or away from the radiused surface of the angle cam.

The entire control mechanism is encapsulated in oil between the upper housing on the outside and the sleeves on the inside. The oil is disposed in a sealed system capable of sealing against differential pressures as high as 2000 psi from the inside to the outside diameter. A flexible bellows of either reinforced elastomer or metal is attached to the end of the angle cam and to the lower end of the sleeve in the upper housing to form a chamber for housing the oil in the system. Also a floating compensating piston is disposed above the electric motors and includes a spring piston which produces a small increase in pressure inside the oil chamber so that possible drilling mud intrusion is reduced. That portion of the cylinders between the small and large pistons is an independent closed system in communication with a pressure relief system.

The bottom hole assembly is preferably connected to composite coiled tubing extending to the surface where electrical conductors and data transmission conductors in the wall of the composite coiled tubing are connected to a power supply and surface processing equipment respectively. The electrical conductors provide power to the steering assembly and the data transmission conductors provide communication between the surface and the steering assembly. Data from the steering assembly is transmitted to the surface where it is processed by the surface processing equipment and commands may then be transmitted to the steering assembly from the surface to, for example, adjust the bend angle and direction of drilling. The steering assembly may also transmit back to the surface verification of the change in bend angle and direction.

Other objects and advantages of the invention will appear from the following description.

BRIEF DESCRIPTION OF THE DRAWINGS

For a detailed description of a preferred embodiment of the invention, reference will now be made to the accompanying drawings wherein:

FIGS. 11A–C are a cross-sectional view of the steerable assembly showing another portion of the pressure compensating system extending from the electric motor to the top end of the steering assembly taken at section 11—11 of FIG. 2;

FIG. 23 is a cross-sectional view of the cam sleeve disposed on the angle cam of FIG. 22;

FIG. 24 is a cross-sectional view of the cam sleeve taken at plane 24—24 of FIG. 23;

FIG. 25 is an elevation view of the wedge member shown in FIG. 22;

FIG. 26 is an end view of the wedge member shown in FIG. 25; and

FIG. 27 is a bottom view of the wedge member shown in of FIG. 25.

DESCRIPTION OF PREFERRED EMBODIMENTS

Figure 1A:
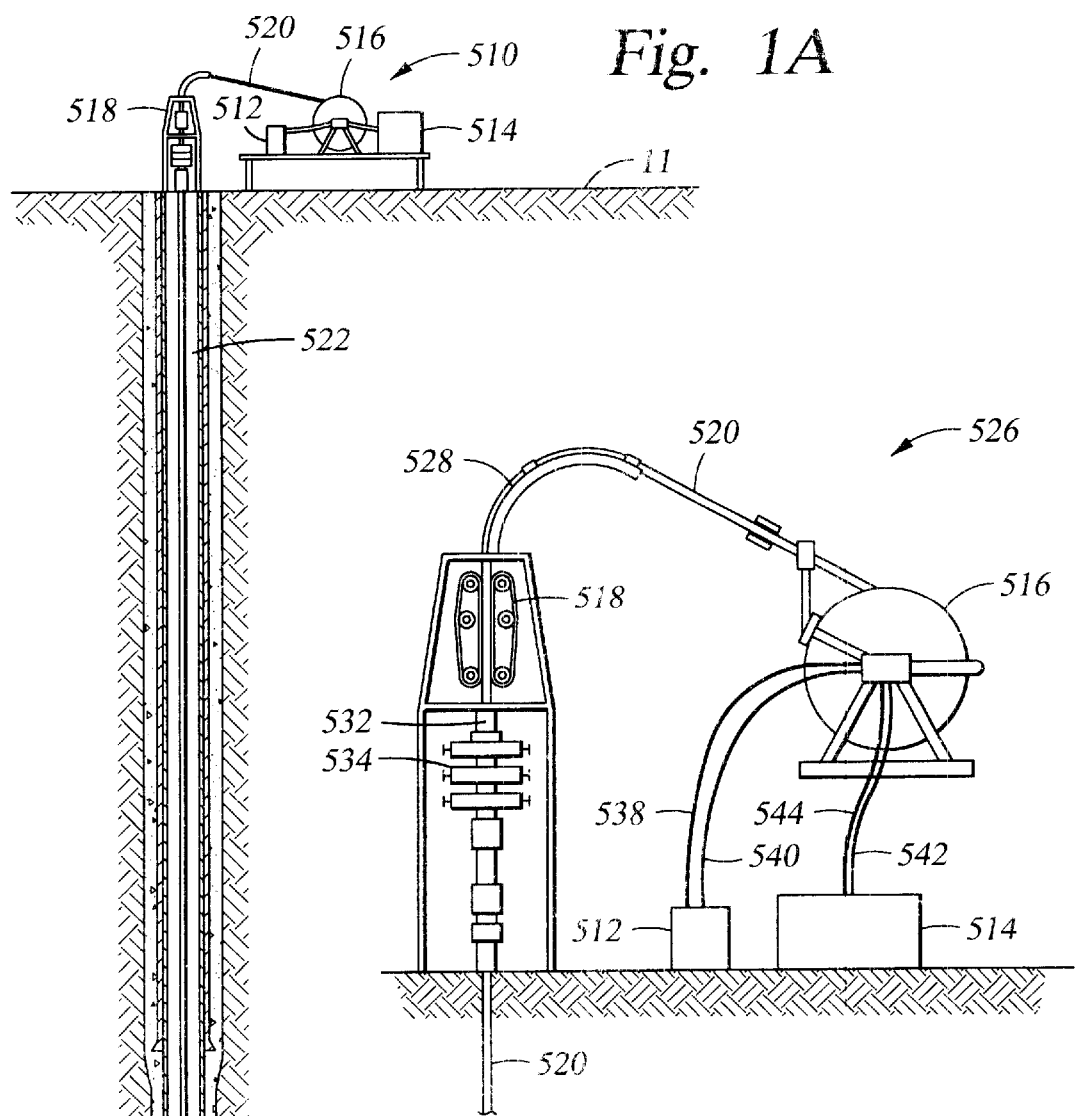
FIG. 1A is a schematic view of an example well.

The present invention relates to methods and apparatus for controlling the bend and direction of the bit in the drilling of a borehole in a well including changing the drilling trajectory of the bit while drilling. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein.

In particular, various embodiments of the present invention provide a number of different constructions and methods of operation of the steerable system, each of which may be used to drill a borehole for a well including a new borehole, an extended reach borehole, extending an existing borehole, a sidetracked borehole, a deviated borehole, enlarging a existing borehole, reaming an existing borehole, and other types of boreholes for drilling and completing a production zone. The embodiments of the present invention also provide a plurality of methods for using the steering assembly of the present invention. It is to be fully recognized that the different teachings of the embodiments discussed below may be employed separately or in any suitable combination to produce desired results. Reference to "up" or "down" are made for purposes of ease of description with "up" meaning away from the bit and "down" meaning toward the bit.

Referring initially to FIG. 1A, there is shown an exemplary operating environment for the present invention. Coiled tubing operation system 510 includes a power supply 512, a surface processor 514, and a coiled tubing spool 516. An injector head unit 518 feeds and directs coiled tubing 520 from the spool 516 into the well 522. Although the coiled tubing 520 is preferably composite coiled tubing hereinafter described, it should be appreciated that the present invention is not limited to composite coiled tubing and may be steel coiled tubing with an umbilical mounted on the steel coiled tubing. A bottom hole assembly 10 is shown attached to the lower end of composite coiled tubing 520 and extending into a deviated or horizontal borehole 524. It should be appreciated that this embodiment is described for explanatory purposes and that the present invention is not limited to the particular borehole disclosed, it being appreciated that the present invention may be used for various well plans.

Figure 1B:
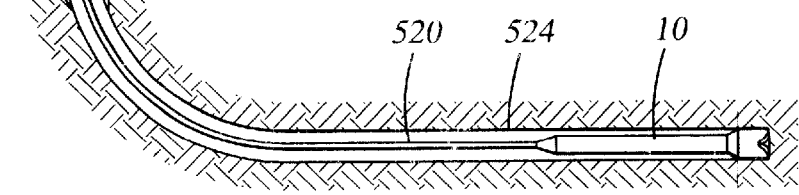
FIG. 1B is an enlarged view of a portion of the schematic of FIG. 1A showing the surface apparatus for the well.

FIG. 1B illustrates coiled tubing unit 526 utilizing spool 516 for feeding composite tubing 520 over guide 528 and through injector 518 and stripper 532. The composite coiled tubing 520 is forced through blowout preventer 534 and into well 522 by injector 518. Power supply 512 is electrically connected by electrical conduits 538, 540 to electrical conduits in the wall of composite coiled tubing 520. Further, the surface processor 514 includes data transmission conduits 542, 544 connected to data transmission conduits also housed in the wall of composite coiled tubing 520. It should be appreciated that power conduits 538, 540 and data transmission conduits 542, 544 housed within the composite tubing wall extend along the entire length of composite coiled tubing 520 and are connected to the supervisory module 580, hereinafter described with respect to FIG. 15, disposed in bottom hole assembly 10. The power conduits and data conduits preferably comprise an economical, low-resistance conductive material such as stranded copper wire. See U.S. patent application Ser. No. 09/081,961 filed May 20, 1998 and entitled Drilling System, hereby incorporated herein by reference.

Figures 1C, 2:
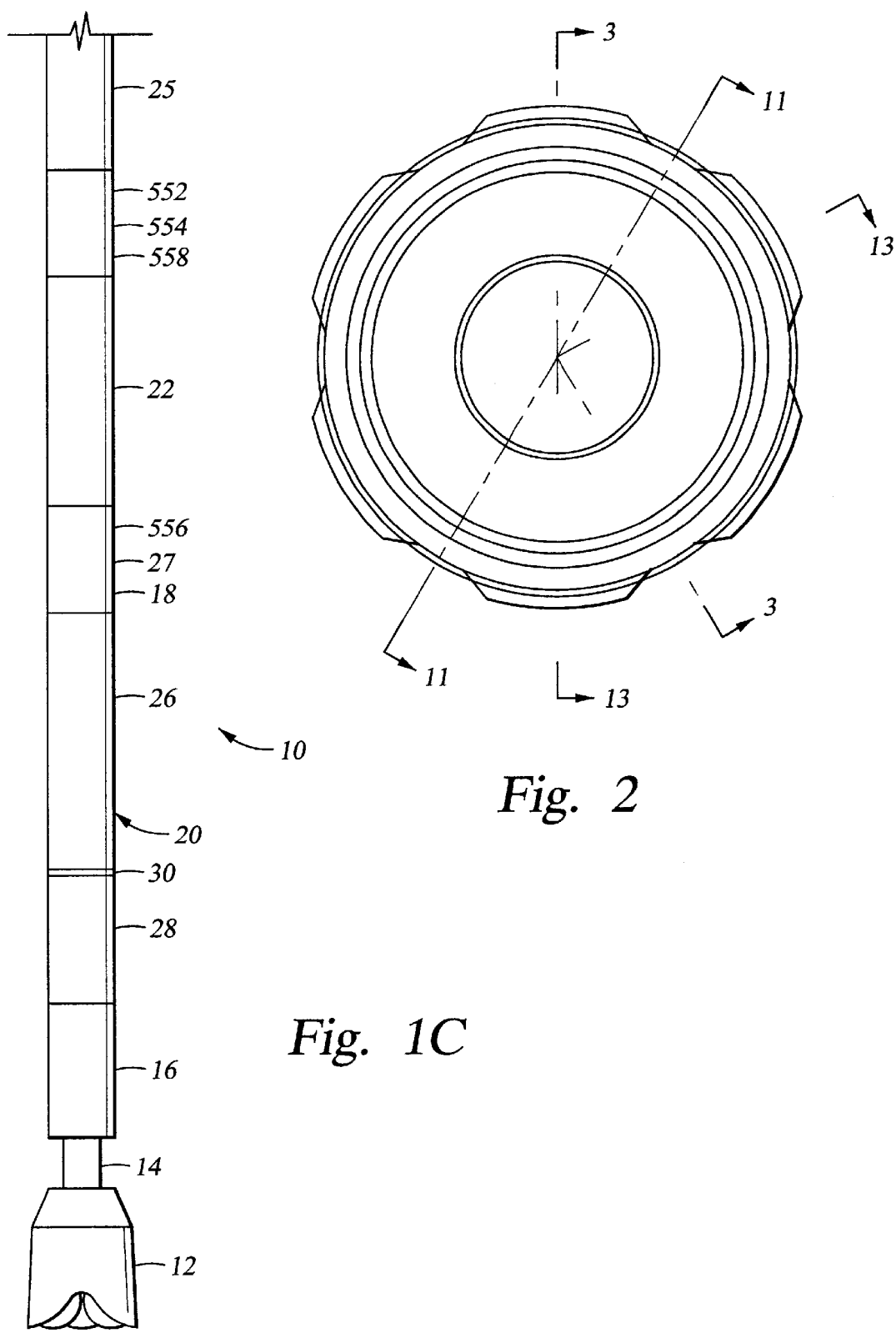
FIG. 1C is an enlarged view of the bottom hole assembly shown in FIG. 1A including the steerable assembly of the present invention.
FIG. 2 is a top end view of the steerable assembly of FIG. 1 showing the cross-sections of FIGS. 3A–E, FIGS. 11A–C, and FIGS. 13A–C.

As shown in FIG. 1C, the steerable system of the present invention includes a bottom hole assembly 10 having a bit 12 mounted on a drive shaft 14, a bearing assembly 16, a steering assembly 20 including an electronics section 18 and preferably a near bit orientation sensor 556 having an inclinometer and magnetometer, an upper constant velocity (CV) sub 616, a power section 22 with wire subs, a check valve 618, a resistivity sub 620, and an electric disconnect 622. The bottom hole assembly 10 may also include a sensor sub 624 including an orientation package 554. Further, the downhole assembly 10 may include additional sensors 552 and downhole control devices 558 hereinafter described. The bottom hole assembly 10 also preferably includes a propulsion system 670 including a lower tractor back pressure control module 660, a lower tension/compression sub 662, pressure measurement sub 664, an upper tractor back pressure control module 666, an upper tension/compression sub 668, a supervisory sub 672, and a flapperball drop 674.

The bottom hole assembly 10 is connected to a work string 25 extending to the surface 11 of the well 522. The steering assembly 20 may be used with any type of work string, such as coiled tubing, composite coiled tubing 520, or drill pipe and also may be used with a wire line. There is no rotation of the bottom hole assembly 20 using either composite tubing or steel tubing. It should be appreciated that other tools may be included in the bottom hole assembly 10. The tools making up the bottom hole assembly 10 will vary depending on the drilling system being used and the borehole being drilled. It should be appreciated that the present invention is not limited to a particular bottom hole assembly and other alternative assemblies may also be used. For example, the steering assembly 20 may be separated from the power section 22 or located above the power section 22. Further details on the individual components of the bottom hole assembly 10 and their operation may be found in U.S. provisional application Ser. No. 60/063,326, filed Oct. 27, 1997 entitled "Drilling System" and U.S. patent application Ser. No. 09/081,961 filed May 20, 1998 entitled "Drilling System", both hereby incorporated herein by reference.

The steering assembly 20 includes an upper housing 26 connected to a lower housing or nose 28 by a universal joint 30 and a pressure housing 27 connected to the upper end of upper housing 26. The lower housing 28 is connected to bearing pack 16 which is connected to and supports the lower end of drive shaft 14 and bit 12. The electronics section 18 and near bit orientation sensor 556 are preferably housed in pressure housing 27. The power section 22, above the pressure housing 27, is typically a positive displacement motor, often referred to as a mud motor, which powers the drive shaft 14 which extends through a flowbore 120, shown in FIG. 3A, extending through the steering assembly 20 and the bearing pack 16.

The bottom hole assembly 10 may also include propulsion system 670, such as a drilling tractor, if the assembly 10 were run downhole on composite coiled tubing 520. A tractor is not required if metal coiled tubing is used. The bottom hole assembly 10 is preferably run on a non-rotating work string 25.

Bearing pack 16 supports the lower end of drive shaft 14 with the end of drive shaft 14 being attached to bit 12. Bearing pack 16 includes radial thrust bearings that support the rotating drive shaft 14. The upper end of drive shaft 14 hangs off of a thrust and radial bearing package at the lower end of power section 22. The bearing pack 16 is conventional and well known in the art. It should be appreciated that various types of bearing packs can be mounted below steering assembly 20.

Figure 3A:
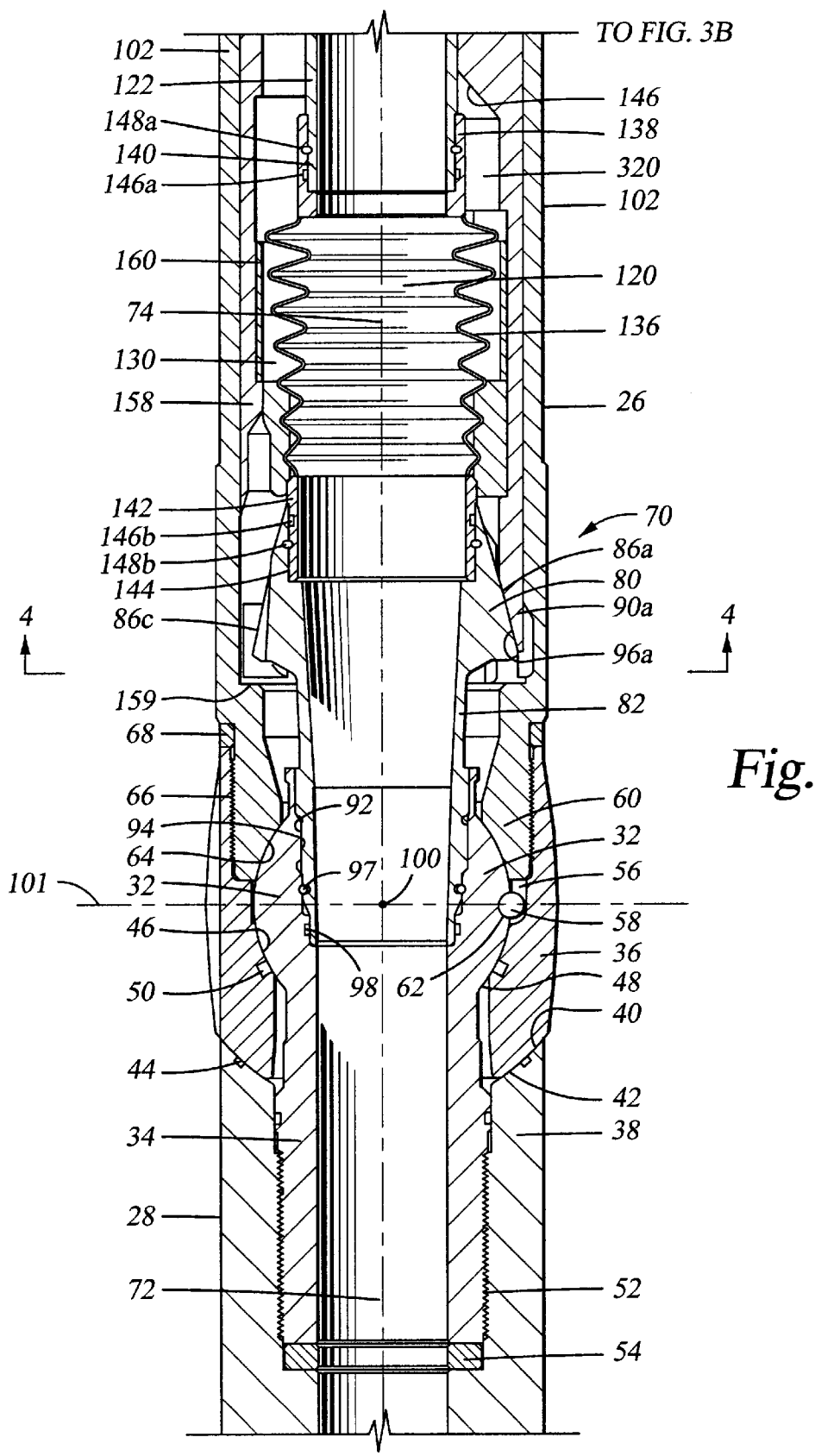
FIGS. 3A, B, C, D, and E are a cross-sectional view of the steerable assembly from the universal joint to the electric motor taken at section 3—3 of FIG. 2.
Figure 3B:
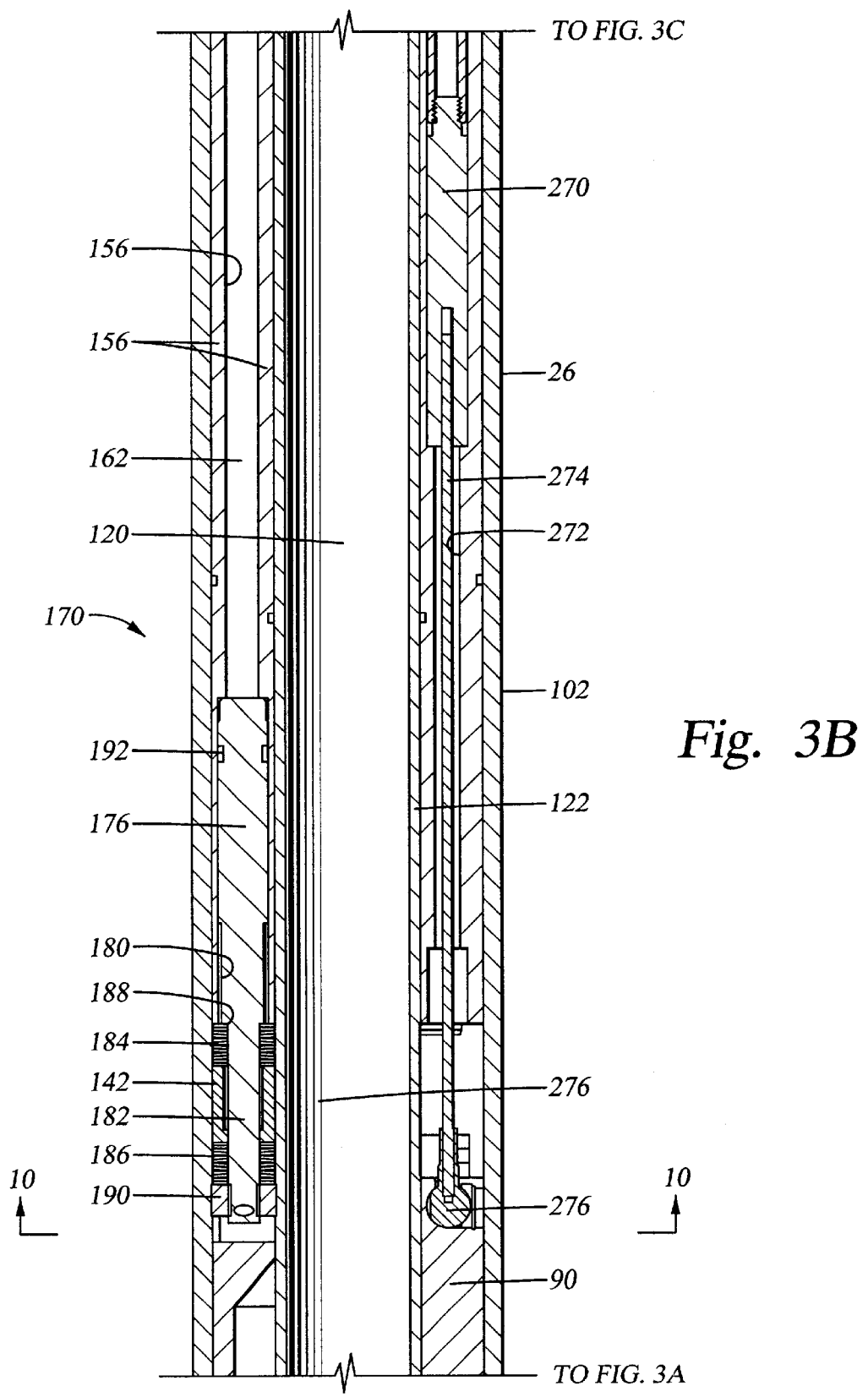
Figure 3C:
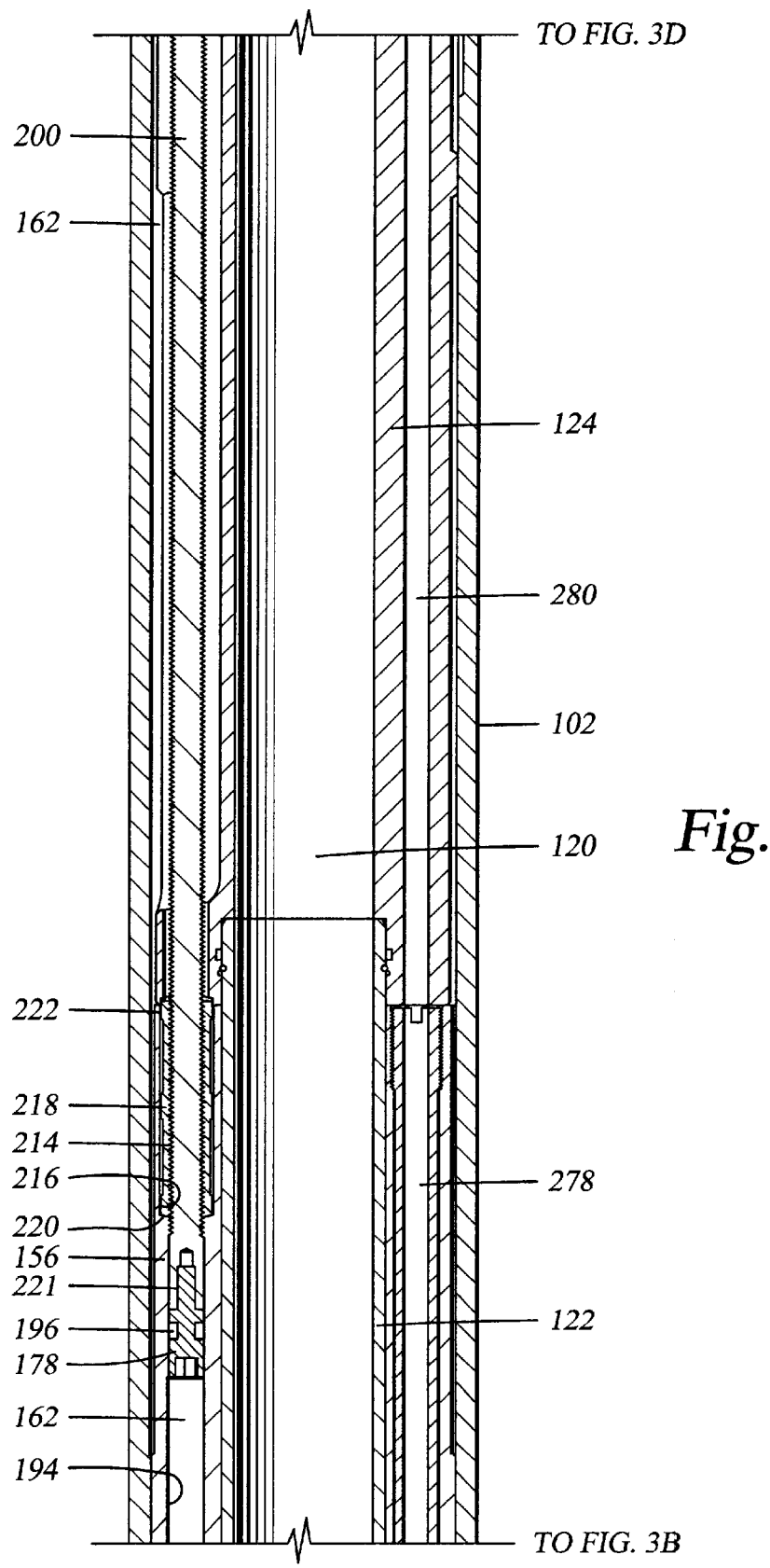

Referring now to FIGS. 2 and 3A, FIG. 2 illustrates the various cross-sections through steering assembly 20 which are shown in FIGS. 3A–E. As best shown in FIG. 3A, upper and lower housings 26, 28 are connected by a universal joint 30 which is a constant velocity joint. The universal joint 30 allows the bend angle and direction of lower housing 28 to be changed with respect to upper housing 26, although upper and lower housings 26, 28 do not rotate with respect to each other. Lower housing 28 serves as a movable nose on the downstream end of steering assembly 20.

The universal joint 30 includes a spherical head 32, such as a knuckle ball or sphere, with a downwardly extending tubular member or sleeve 34. The knuckle ball 32 is disposed within a knuckle joint housing 36 mounted on the upper terminal box end 38 of lower housing 28. The knuckle joint housing 36 has an outer concave surface 40 in pivotal engagement with a convex surface 42 on the terminal end of box 38 of lower housing 28. A seal 44 seals between surfaces 40, 42 and may be a wiper seal.

The knuckle joint housing 36 includes an inner convex surface 46 adapted for pivotal engagement with the outer spherical surface 48 of knuckle ball 32. A sealing member 50 seals between surfaces 46, 48. The knuckle joint sleeve 34 is connected to the box end 38 of lower housing 28 such as by threads 52. A spacer 54 is provided in the bottom of the box end 38 to provide proper pivotal engagement between surfaces 40, 42 and 46, 48. The knuckle joint housing 36 includes a plurality of individual slots 56, each housing a bearing 58 which is also disposed in a spherical notch 62 in the surface 48 of knuckle ball 32. This allows the knuckle ball 32 to fully rotate within convex surface 46 of knuckle ball housing 36 upon the application of thrust and load.

The universal joint 30 further includes a cage 60 on the lower end of upper housing 26. The cage 60 has a downwardly facing concave surface 64, which engages the spherical surface 48. Cage 60 includes an outer threaded reduced diameter 66 which is threadingly received by knuckle ball housing 36. Spacer 68 provides proper spacing for pivotal engagement between surfaces 64, 66. Knuckle ball 32 is thus captured within knuckle ball housing 36 and cage 60 to form universal joint 30.

Since knuckle ball 32 is rotatably mounted within knuckle ball housing 36, the nose or lower housing 28 may pivot on the lower end of upper housing 26. As lower housing 28 pivots with respect to upper housing 26, a bend is formed between upper and lower housings 26, 28 in that the axis 72 of lower housing 28 is no longer coincident with the axis 74 of upper housing 26. The angle formed at approximately point 100 between axes 72 and 74 is referred to as the bend angle. Further, the bend can occur at different angular orientations about the axis 74 referred to as the direction of drilling. By causing a bend angle between the housings 26, 28 in a particular angular direction about the axis 74, the direction and angle of the tool face is changed thus changing the axis 72 of drilling of bit 12 and thus the path of the borehole. The universal joint 30 prevents relative rotation between the motor power section 22 and bearing pack 16.

Figure 4:
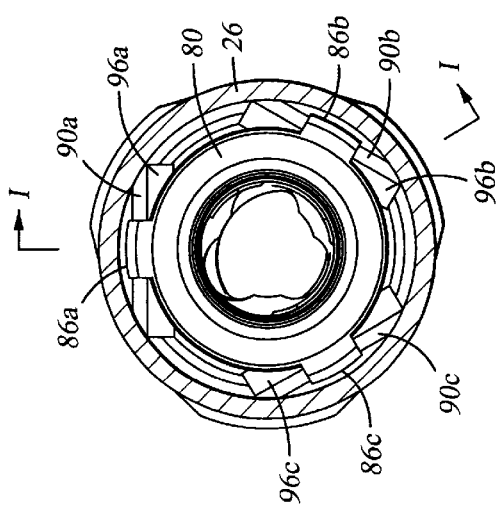
FIG. 4 is a cross-sectional view of the wedge members and angle cam taken at section 4—4 of FIG. 3A.
Figure 5:
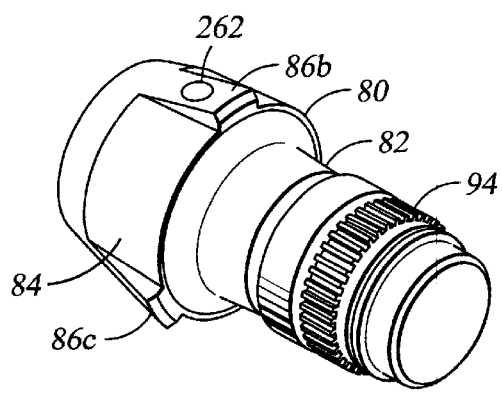
FIG. 5 is a perspective view of the angle cam shown in FIG. 3A.
Figure 6A:
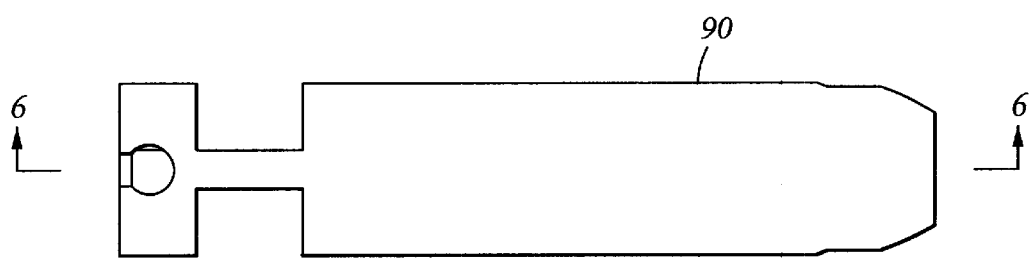
FIG. 6A is a top elevation view of a wedge member shown in FIG. 3A.
Figure 6B:
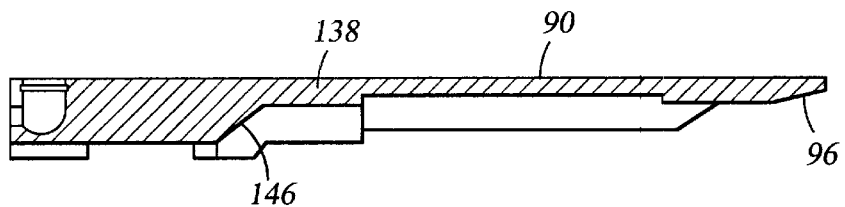
FIG. 6B is a cross-sectional view of the wedge member taken at section 6—6 in FIG. 6A.
Figure 6C:
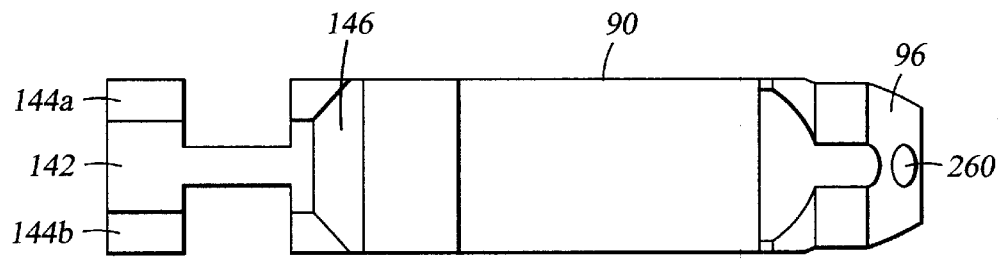
FIG. 6C is a bottom view of the wedge member of FIG. 6A.

Referring now to FIGS. 3A, 4 and 5, a directional mechanism 70 is provided in steering assembly 20 to alter both the direction of the bend and the angle of the bend. The directional mechanism 70 includes an angle cam 80 and a plurality of cam members or directional wedge members 90 to control the direction and angle of the drilling of the bit 12. The angle cam 80 and wedge members 90 vary the axis 72 of the bit 12 with respect to the axis 74 of the remainder of the bottom hole assembly 10.

The angle cam 80 is a cam member having a tubular body 82 with an enlarged head 84. Enlarged head 84 has three upwardly facing cam surfaces 86a, 86b, and 86c azimuthally spaced 120° apart. The cam surfaces 86a, 86b, 86c do not extend all the way around angle cam 80 as shown in FIG. 5 and each have a radiused surface extending generally axially of angle cam 80 as shown in FIG. 3A. The radius of cam surfaces 86 is preferably twelve inches from a point on the center line 101 of the knuckle ball 32 approximately 10 and one half inches below pivot point 100. The tubular body 82 of angle cam 80 is received within an enlarged bore 92 within knuckle ball 32. The wall forming bore 92 and the tubular body 82 have mating splines at 94 to prevent relative rotation therebetween. An expandable ring 97 connects angle cam 80 with knuckle ball 32 causing angle cam 80 to be an extension of the knuckle ball 32. A sealing member 98 seals between angle cam 80 and knuckle ball 32. The angle cam 80 pivots and rotates with the lower housing 28 and thus with bearing pack 16 and bit 12. The angle cam 80 projects a predetermined distance above the pivot point 100 of universal joint 30 such that upon camming angle cam 80 in one direction, lower housing 28 moves with the bearing pack 16 and bit 12 in the opposite direction.

Referring now to FIGS. 3A, 4 and 6A–C, there are three wedge members 90a, 90b, and 90c having wedge surfaces 96a, 96b, 96c, respectively, which engage the three cam surfaces 86a, 86b, and 86c, respectively, on angle cam 80. Each wedge surface 96a, 96b, 96c contacts a corresponding cam surface 86a, 86b, and 86c over an area so as to provides three areas of contact 260, 262, best shown in FIGS. 5 an 6C, between wedge members 90 and angle cam 80. The loci of contact areas as the wedge members 90 move over radiused surfaces 86 forms a line. The three areas of contact 262 on angle cam 80 form a plane. The axis 72 of lower housing 28 is normal to that plane such that as the plane is moved by the wedge members 90, the knuckle ball 32 pivots within housing 36 and cage 60 to change the direction of drilling. In operation, as knuckle ball 32 moves within ball housing 36 and cage 60, lower housing 28 also moves along the arcuate surfaces 40, 44 at the interface between ball housing 36 and lower housing 28.

The angle and direction of drilling can be changed by controlling and coordinating the axial extent of each of the three wedge members 90 thereby changing the plane formed by the areas of contact 260, 262 with axis 72 being normal to that plane, thus changing the direction of knuckle ball 32 via angle cam 80. For example, as one wedge 90a is moved downwardly, another wedge 90b may be moved upwardly to cause the angle cam 80 to pivot knuckle ball 32 in a given angular direction about axis 74 and at a given bend angle between axes 72, 74.

Thus, steering assembly 20 guides bit 12 three dimensionally. The wedge members 90 allow the direction of drilling to be made in any 360° angular direction and with an incline or bend angle of up to 4°. The directional changes are made about pivot point 100 of knuckle ball 32.

Figure 22:
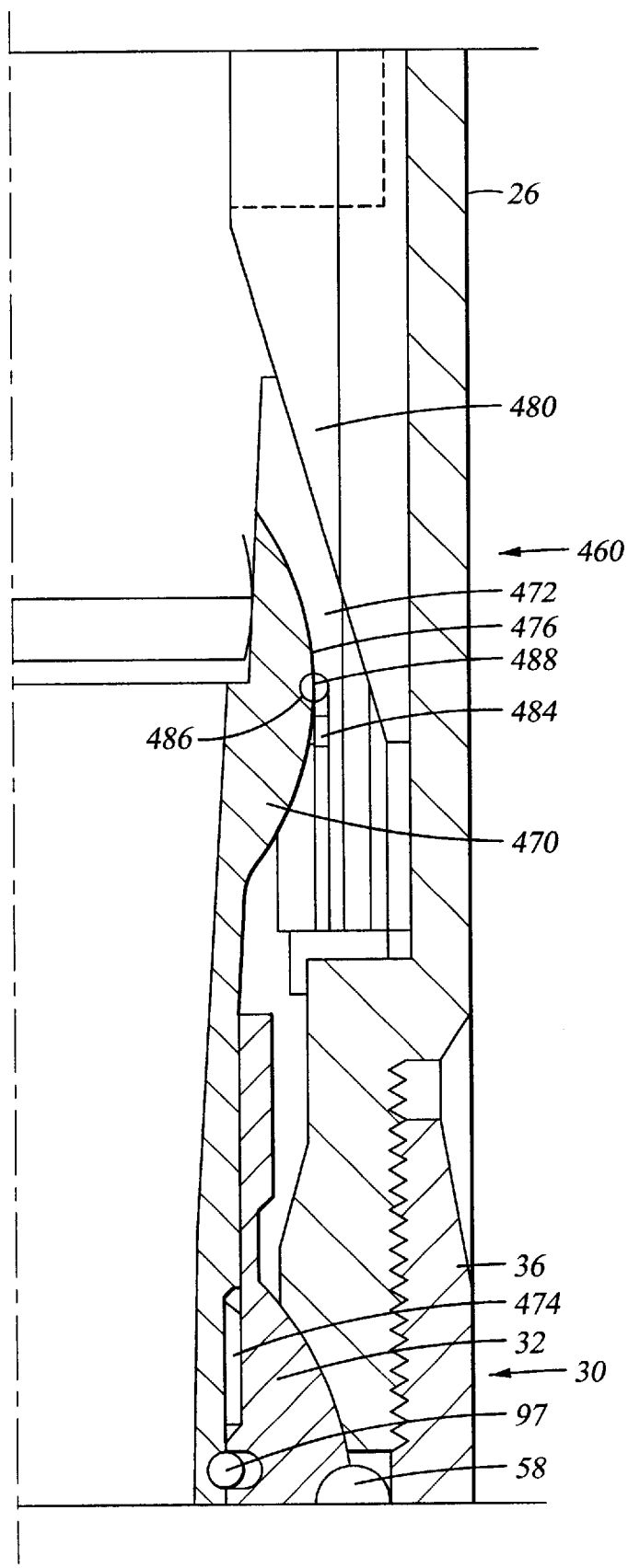
FIGS. 22 is a cross-sectional view of an alternative angle cam and wedge members disposed on the universal joint taken at section 2—2 of FIG. 2.

Referring now to FIGS. 22–27, there is shown an alternative embodiment of the angle cam and the wedge members. Referring particularly to FIGS. 22–24, the alternative directional mechanism 460 includes an angle cam 470, an angle cam sleeve 472, and a plurality of cam members or directional wedge members 480 to control the direction and angle of the drilling of the bit 12. The angle cam 470 is connected by splines at 474 to the knuckle ball 32 of universal joint 30. As distinguished from angle cam 80, angle cam 470 includes a spherical head 476 onto which is disposed cam sleeve 472. Cam sleeve 472 includes a cam housing 478 having an arcuate curved surface 482 for slidingly and rotatably receiving the spherical head 476 of angle cam 470. Cam housing 478 includes a bearing race 484 positioned opposite a bearing race 486 in the head 476 of angle cam 470 for housing ball bearings 488 therebetween. Cam sleeve 472 includes a retainer ring 490 having an arcuate surface 492 for capturing head 476 within cam sleeve 472 by the engagement of threads 494. Bearing race 484 includes an transverse arcuate dimension allowing a limited rotational movement of cam sleeve 472 on spherical head 476 of angle cam 470. Angle cam sleeve 472 includes three upwardly facing and inwardly tapering cam surfaces 496a, b, and c. Cam surfaces 496a, b, and c do not extend all the way around angle cam sleeve 472 as shown in FIG. 24 and each has a radiused surface extending generally axially of angle cam sleeve 472 as shown in FIG. 23.

Referring now to FIGS. 22 and 25–27, the three wedge members 480a, b, and c include wedge surfaces 498a, b, and c, respectively, for engagement with cam surfaces 496a, b, and c, respectively, of angle cam sleeve 472. Each wedge surface 498 is covered with a bearing material 500 as for example a Duralon bearing material. Each wedge surface 498a, b, and c contacts a corresponding cam surface 496a, b, and c over an area so as to provide three areas of contact between wedge members 480 and angle cam sleeve 472. Bearing races 484 allow cam sleeve 472 to rotate through a limited angle 502 as shown in FIG. 23.

Referring now to FIGS. 3A–E, upper housing 26 includes a lower tubular member 102 with its lower terminal end attached to or integral with cage 60 and an upper motor housing 104. Motor housing 104 must be properly aligned with the lower tubular member 102. Thus, the upper motor housing 104 is connected to the lower tubular member 102 by a turnbuckle 106 (FIG. 3D) so as to maintain proper alignment. The lower terminal end of motor housing 104 and the upper terminal end of lower tubular member 102 have threaded boxes 108, 110, respectively, for threaded engagement with the threaded pins 112, 114, respectively, of turn buckle 106. The outer sleeve 116 of turn buckle 106 is rotated to thread the connection together. One of the pin/box threads is left handed with the other pin/box thread being right handed. Only the turn buckle 106 rotates during connection with the upper motor housing 104 and lower tubular member 102 remaining stationary.

Central flowbore 120 is extends the length of steering assembly 20. Drilling fluids flow through flowbore 120 to the bit 12 and are also used to power the mud motor 22. The drive shaft 14, shown in FIG. 12, also extends through flowbore 120. The flowbore 120 through upper housing 26 is formed by a lower inner sleeve 122, a bottom spacer sleeve 124, a middle spacer sleeve 126, an upper spacer sleeve 128 and a bore 132 through motor housing 104. Lower inner sleeve 122 and lower tubular member 102 form an annular area 130 which is part of a closed fluid chamber 320, hereinafter described in detail, and extends from the universal joint 30 up to the motor housing 104.

An expandable/contractible seal member 136 extends from the lower terminal end of inner sleeve member 122 to the upper terminal end of angle cam 80. Seal member 136 may be a flexible bellows of either reinforced elastomer or metal such as a metal bellows or a flexible rubber boot. Alternatively a cylinder with seals on each end, extending between member 122 and angle cam 80, may be used as a substitute for member 136. Member 136 may act as an oil volume compensator. Member 136 includes an upper box end 138 of member 136 which receives the lower terminal pin end 140 of inner sleeve 122 and a lower pin end 142 which is received by a counterbore 144 in angle cam 80. Seals 146a and 146b are provided to seal the connection and snap rings 148a and 148b maintain the connections. Member 136 isolates the fluid, such as oil, in outer annular area 130 from drilling fluids flowing through central flowbore 120 and around the drive shaft 14 (not shown in FIG. 3). Thus moving parts, hereinafter described, housed in closed fluid chamber 320 are not contaminated by the drilling fluids flowing through the central flowbore 120. Member 136 acts merely as an isolation barrier since the pressure of the drilling fluids passing through flowbore 120 is substantially the same as the pressure of the fluid in closed fluid chamber 320. Any pressure differential across seal member 136 is inadvertent.

Referring again to FIGS. 6A–C, each wedge member 90 includes an elongate arcuate body 138 having a camming wedge surface 96 on its lower end and a T-head 142 on its upper end. T-head 142 has a pair of holes 144a, 144b therethrough for attaching a drive train such as hereinafter described. Camming wedge surface 96 can be greater or less than a locking taper although a non-locking taper is preferred and is generally between 5° and 30°. More preferably, camming wedge surface 96 is 15° or more since a taper less than 15° is typically considered a locking taper. A clearance taper 146, such as 40°, is also provided to allow movement of angle cam 80.

Figure 7:
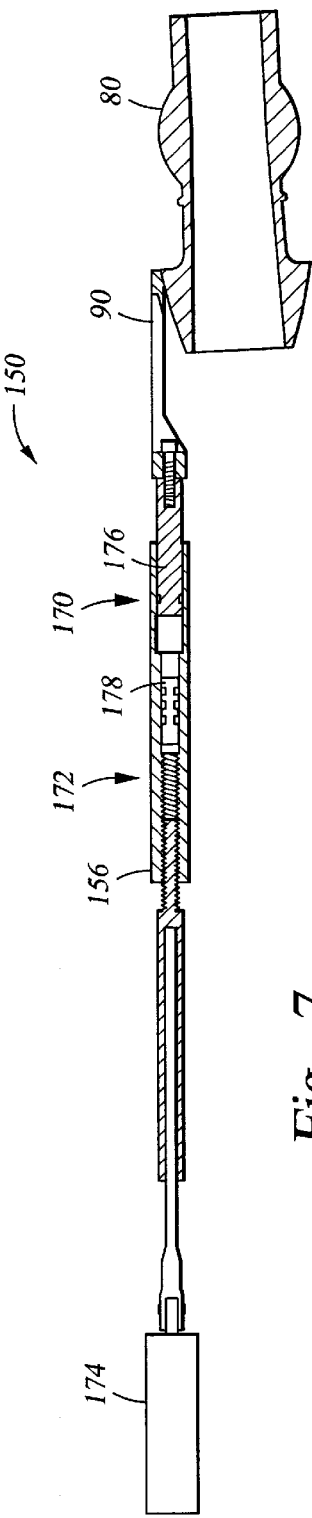
FIG. 7 is a schematic view, partially in cross-section, of a mechanical hydraulic drive train shown in FIGS. 3A–E for a wedge member engaging the angle cam.
Figure 8:
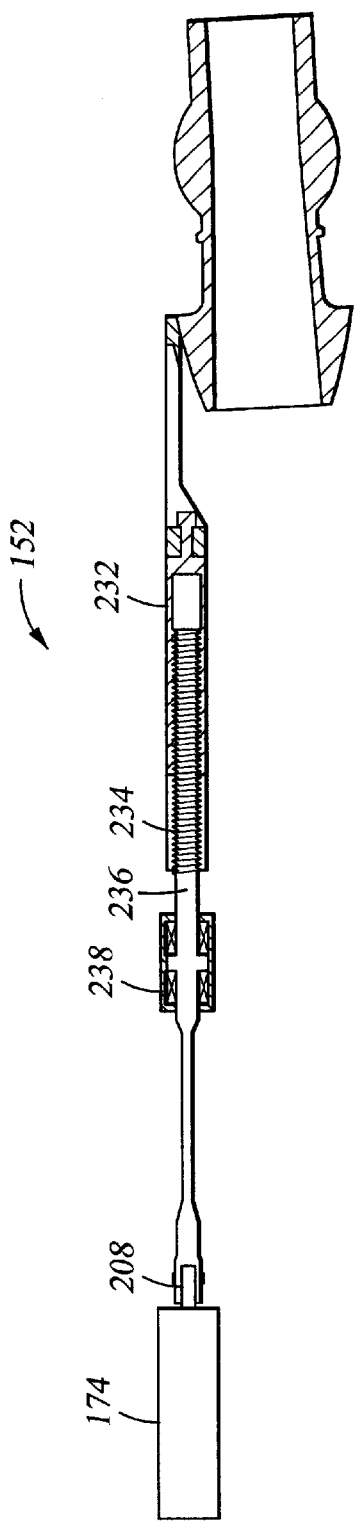
FIG. 8 is a schematic view, partially in cross-section, of an alternative mechanical drive train for a wedge member engaging the angle cam.
Figure 9:
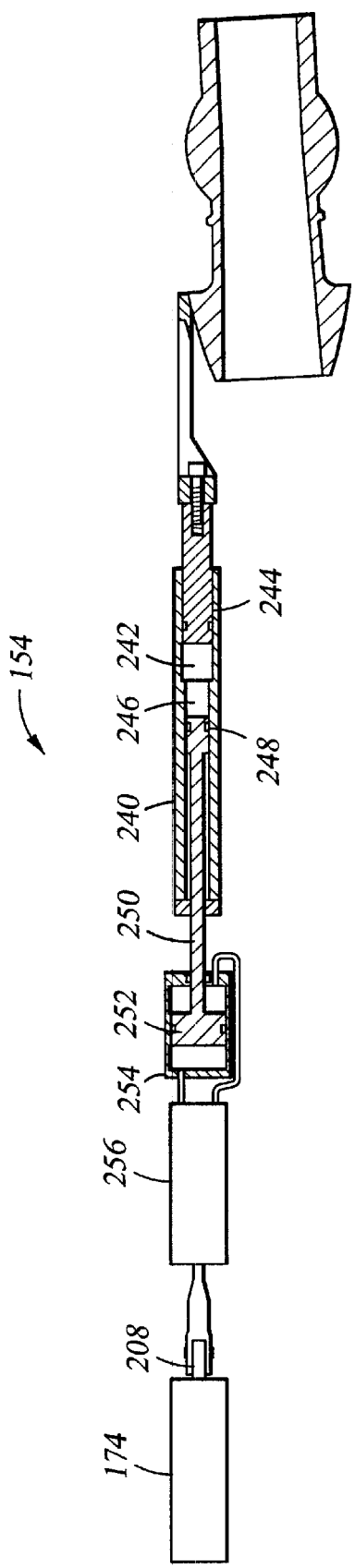
FIG. 9 is a schematic view, partially in cross-section, of another alternative hydraulic drive train for a wedge member engaging the angle cam.

Referring now to FIGS. 7, 8, and 9, various drive mechanisms or drive trains may be used to vary the axial extent of the individual wedge members 90. FIG. 7 illustrates the drive train 150 of the preferred embodiment shown in FIG. 3. This is a mechanical and hydraulic drive train. FIG. 8 illustrates a mechanical drive train 152 and FIG. 9 illustrates a hydraulic drive train 154. Each are powered by an electric motor 174 with the electrical power preferably being provided from the surface through electrical conduits 562, 564, shown in FIG. 15, extending through composite coiled tubing 520 or alternatively from batteries housed in bottom hole assembly 10.

Referring particularly now to FIGS. 3A–C, 7, and 10, there is shown the mechanical/hydraulic drive train 150 for individually operating each of the wedge members 90a, 90b, and 90c. A generally tubular wedge body 156 is housed in closed fluid chamber 320 and includes a plurality of fingers 158 projecting from its lower end. A support sleeve 160 is attached to fingers 158 to provide sliding support for wedge members 90. The three arcuate fingers 158 extend downwardly past the end of wedge members 90 with their terminal ends engaging upwardly facing annular shoulder 159 on the upper end of cage 60. The three fingers 158 extend between the three wedge members 90 to provide slots therebetween in which wedge members 90 may slide.

Three azimuthally spaced apertures 162 extend through wedge body 156, outside of lower inner sleeve 122, through bottom spacer sleeve 124, middle spacer sleeve 126, upper spacer sleeve 128 and motor housing 104 to house each of three drive trains 150 for actuating wedge members 90a, 90b, and 90c. Since each of the drive trains 156 are the same, only one of the drive trains will be described in detail.

Drive train 150 includes a hydraulic amplifier 170, a mechanical amplifier 172, and a power source in the form of motor 174. The hydraulic amplifier 170 includes a pair of large pistons 176 associated with a small piston 178. The pair of large pistons 176 is disposed in large cylinders 180 and the small piston 178 is disposed in small cylinder 194, cylinders 180, 194 being azimuthally spaced in 120° arcuate segments in wedge body 156. Each wedge member 90 is attached to a pair of large pistons 176. There are three sets of large pistons 176 and small pistons 178, i.e. one set for each of the three wedge members 90. The lower end of each large piston 176 has a reduced diameter shaft 182 which passes through apertures 144a and 144b in T-head 142 of wedge member 90. Upper and lower sets of Belleville springs 184, 186 are disposed on each side of the T-head 142 of wedge member 90. Upper springs 184 are captured between a downwardly facing shoulder 188 on large piston 176 and the upper terminal end of T-head 142, and lower springs 186 are captured between the downwardly facing side of T-head 142 and a nut 190 threaded onto the lower threaded end of shaft 182 to form a spring loaded connection. O-ring grooves and dynamic seals 192 are disposed around large piston 176 for sealing engagement with the cylindrical wall of cylinder 180. The Belleville springs 184, 186 permit limited relative axial movement between large pistons 176 and wedge members 90.

Clyinder The 194 within which is housed small piston 178 is an upper reduced diameter bore in wedge body 156. Small piston 178 also includes grooves and dynamic seals 196 for sealing engagement with the cylindrical wall of reduced diameter cylinder 194. Cylinder 194 is filled with an incompressible fluid between small piston 178 and large pistons 176 thus forming a closed hydraulic system. One incompressible fluid in cylinders 180, 194 may be oil. Pressure relief system 340, hereinafter described, is in fluid communication with that portion of cylinders 194, 180 between small piston 178 and large pistons 176.

The hydraulic amplifier 170 is locked in place within the wedge body 156 of upper tubular member 102. Alignment pins (not shown) are used to mate and align lower spacer 124 and middle spacer 126. Middle spacer 126 is aligned with lower tubular member 102 by keys and slots 198. The hydraulic amplifier 170 is aligned in a specific orientation with respect to the arcuate cam surfaces 86 of angle cam 80 for proper engagement with the tapered wedge surfaces 96 of wedge members 90.

The smaller piston 178, in conjunction with the larger pistons 176, provide hydraulic amplification. The large pistons 176 close large cylinders 180 at its lower end and small piston 178 closes small cylinder 194 at its upper end thus forming a closed hydraulic system therebetween. The small piston 178 drives a pair of the large pistons 176 as small piston 178 moves downwardly within small cylinder 194. The cylinders 194, 180 have sufficient length to allow wedge members 90 and angle cam 80 the necessary relative movement to change direction and angle. The pair of large pistons 176 maximizes the piston area as compared to the smaller piston area of small piston 178. The amplification of the small piston 178 with respect to the two large pistons 176 is approximately 5 to 1.

It should be appreciated that the present invention is not limited to a pair of large pistons for each wedge member 90. There may be just one large piston or a plurality of pistons. Obviously, the piston area of each of the large pistons may also be varied.

Referring particularly now to FIGS. 3C–E and 7, the hydraulic amplifier 170 is connected to the mechanical amplifier 172. The mechanical amplifier 172 includes a threaded rod such as a drive shaft jack screw 200 connected at its lower end to small piston 178 and at its upper end to a lower double constant velocity joint 202. Lower double constant velocity joint 202 connects screw 200 to an expandable/contractible member 204, which is connected at its upper end to an upper double constant velocity joint 206. Upper double constant velocity joint 206 connects expandable/contractible member 204 and thus screw 200 to the drive shaft 208 of electric motor 174 by means of combination radial thrust bearings 210. A plug 212 is provided around the drive shaft 208 and bears against the upper terminal end of upper spacer 128. Motor 174 also includes a gear reduction. Electrical conduits 228 pass through chamber 229 and connect the motor 174 to electrical connectors 230 which are connected to the electronics package 18. The electric motor 174 requires little power from the surface.

The electronic motor 174 is controlled from the electronics package 18. The electric motor 174 may be of the brush type or the brushless type. If it is a brush type motor, a motion sensor (not shown) would be housed above the electric motor 174 and disposed on the upper end of the motor shaft. The motion sensor determines the number of rotations made by the motor in one direction or the other. A brushless type motor, however, is preferred.

The screw 200 is threaded and includes a nut 214 disposed in a enlarged bore 216 of bore 162 in the upper end of wedge body 156. A plurality of balls 218 are disposed in slots within enlarged bore 216 to prevent rotation of the nut 214 within bore 216. Nut 214 is locked in position by upwardly facing shoulder 220 and the lower terminal end 222 of lower spacer 124. Thus, as the drive shaft screw 200 rotates within bore 162 and threaded nut 214, the threads cause drive shaft screw 200 to move axially within wedge body 156. Since the lower end of drive shaft screw 200 is attached to small piston 178 at 221, hydraulic fluid pressure within cylinder 194 is varied causing varied hydraulic pressure on the large pistons 176. Thus, it can be seen that as drive shaft screw 200 rotates, the threads on nut 214 cause drive shaft screw 200 to move upwardly or downwardly and thus cause small piston 178 to move upwardly and downwardly in reduced diameter cylinder 194. The screw 200 has an amplification of approximately 16 to 1.

The wedge members 90 also prevent the side load variations at the bit 12 from being seen at the hydraulic amplifier 170 so that no excessive pressures are seen by its dynamic seals. The hydraulic amplifier 170 reduces the amount of axial load required to move the threaded screw 200 and thus reduces the frictional losses required to move the screw 200 that acts as a jack screw. This also reduces the frictional losses from axial movement of the expandable/contractible member 204 due to the lesser loads.

Figure 3D:
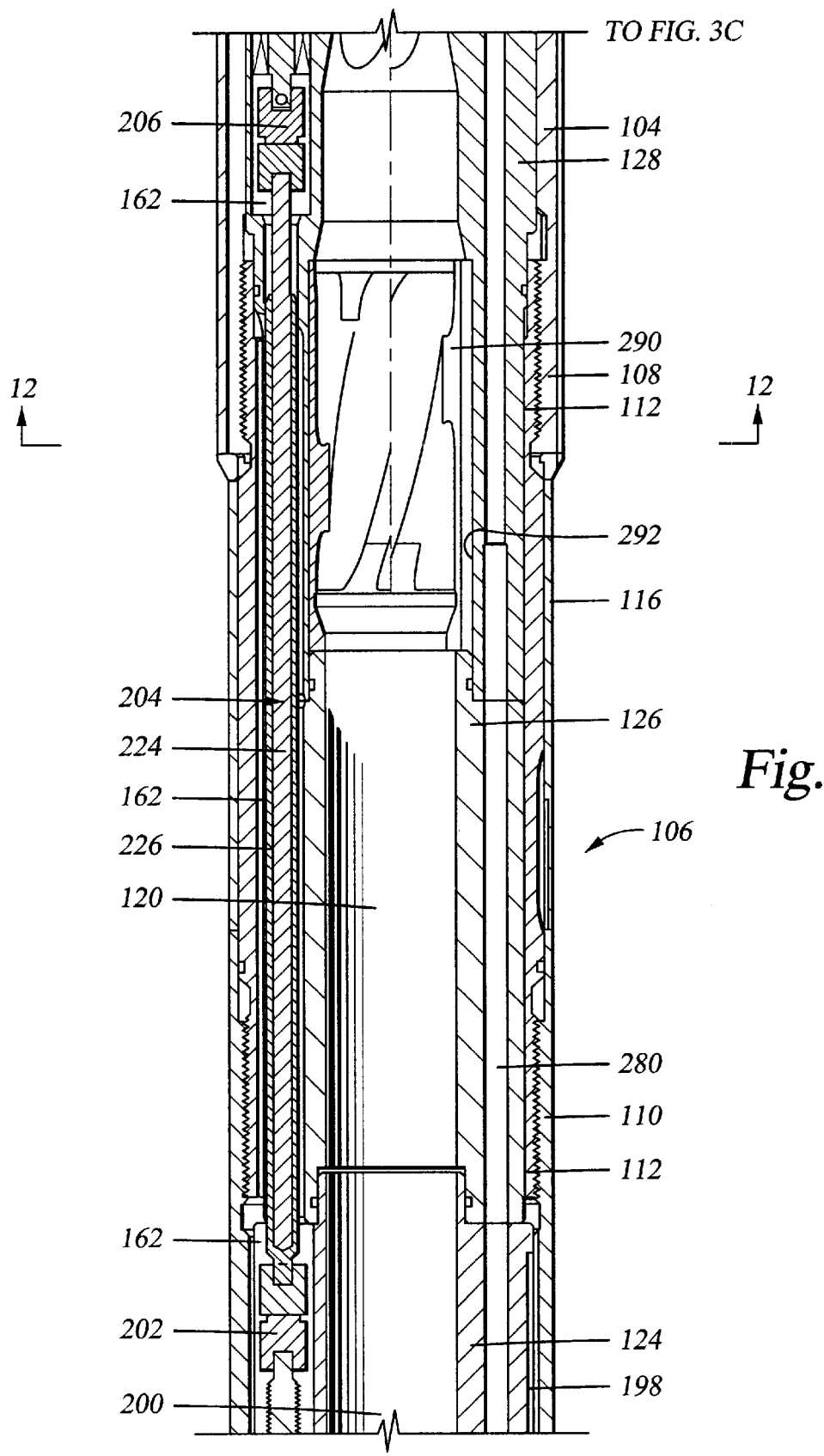
Figure 3E:
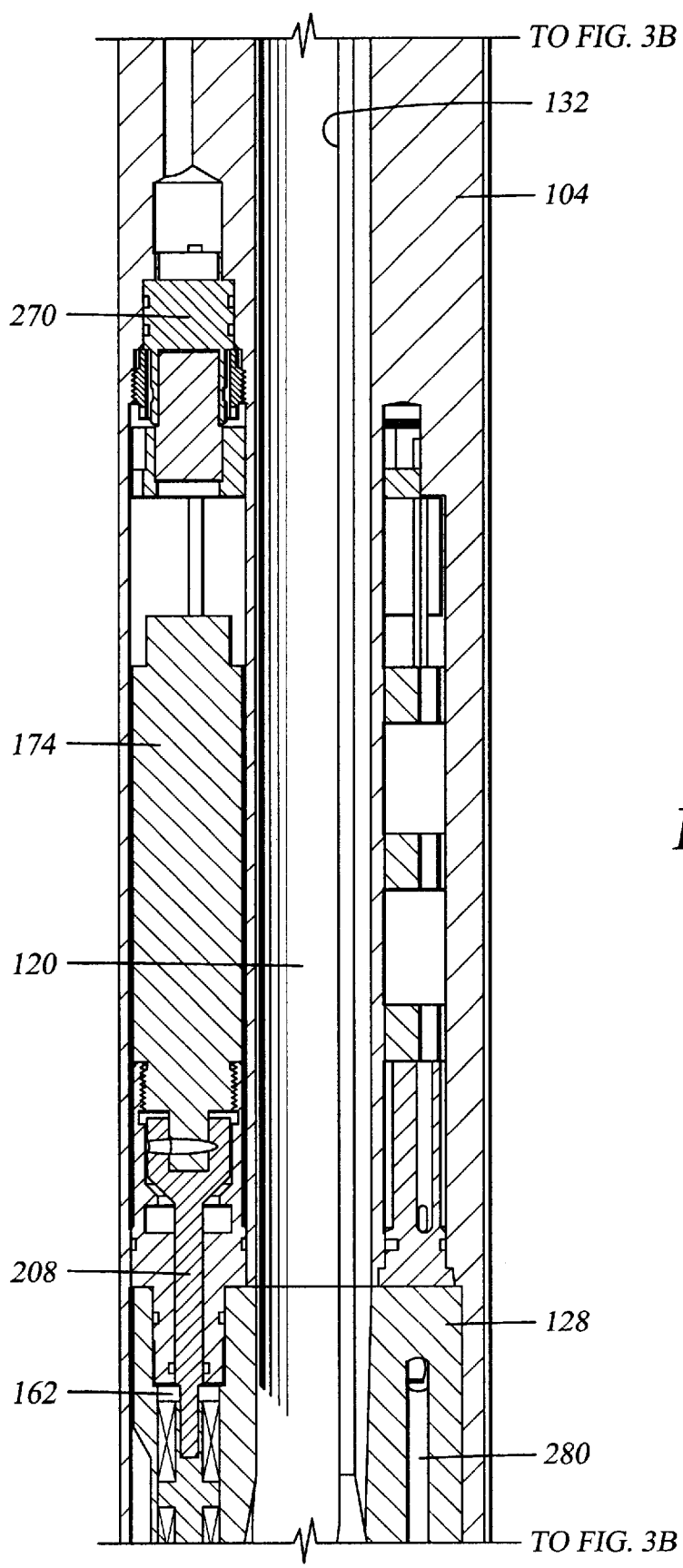

Referring particularly now to FIG. 3D, expandable/contractible member 204 includes a splined shaft 224 having its upper end connected to upper double constant velocity joint 206 and an outer member 226 having its lower end connected to lower double constant velocity joint 202. Splined shaft 224 is received within a splined bore of outer member 226 allowing the inner splined shaft 224 to slide within outer member 226. The engagement of the splines on shaft 224 and outer member 226 allow torque to be transmitted therebetween thereby causing shaft 224 and outer member 226 to rotate together while allowing expandable/contractible member 204 to expand or contract axially as shaft 224 slides within outer member 226. The splined members 224, 226 are designed to carry torque and also have relative axial movement. The threads on nut 214 pull drive shaft screw 200 and outer spline member 226 axially downward. The double constant velocity joints 202, 206 allow the angular offset of expandable/contractible member 204 which may be caused by the bending of steering assembly 20 as drilling progresses through the bore hole 524.

If the steering assembly 20 becomes stuck in the hole or there is a power outage, as for example, and the steering assembly 20 has a large inclination, such as 3–4°, the steering assembly 20 has designed flexibility such that it can be removed from the hole. If the steering assembly 20 is bowed, the constant velocity joints 202, 206 allow the steering assembly 20 to still operate. Without constant velocity joints 202, 206, the expandable/contractible connection 204, for example, would otherwise bind if the steering assembly 20 were to become bowed. The drive shaft 14 would flex. The constant velocity joints 202, 206 allow sufficient side movement such that the sliding splines on members 224, 226 do not bind. The lower constant velocity joint 202 also keeps the threads of the drive shaft screw 200 from binding.

In operation, the electric motor 174 turns inner spline member 224 which in turn rotates outer spline member 226 and drive shaft screw 200. As drive shaft screw 200 rotates within threaded nut 214, outer spline member 226 and drive shaft screw 200 move axially causing small piston 178 to move axially either up or down depending upon the direction of rotation of motor 174. For example, as small piston 178 moves downwardly within reduced cylinder 194, large pistons 176 also move downwardly causing a wedge 90 to move downwardly. This varies the engagement of the wedge member 90 with angle cam 80 at contact areas 260, 262 thereby moving the plane formed by contact areas 260, 262 and the normal axis 72. This of course alters the direction of drilling of bit 12.

Hydraulic amplifier 170 has an amplification of approximately 5 to 1 and mechanical amplifier 172 has an amplification of approximately 16 to 1. These amplifications produce approximately 1,500 psi of axial force from surfaces 96 of wedge members 90 onto surfaces 86 on angle cam 80 and a much higher normal force of approximately 5000 pounds on wedge surfaces 96 onto surfaces 86 on angle cam 80 due to mechanical advantage of the wedge angle.

It is to be appreciated that other types of drive mechanisms may be used for axial movement of wedge members 90. Referring again to FIGS. 8 and 9, FIG. 8 illustrates a mechanical drive train 152 which includes a wedge body 232 connected to a ball power screw or roller screw 234. The drive shaft 236 of power screw 234 is supported by thrust bearings 238 and is attached to the output shaft 208 of motor 174. Thrust bearings may be disposed on each side of power screw 234 to better support it by sharing the axial force. FIG. 9 illustrates hydraulic drive train 154 which includes a wedge body 240 having a large cylinder 242 housing one or more large pistons 244. Reduced cylinder 246 houses a small piston 248. Small piston 248 is attached to a shaft 250 which in turn is connected to a double acting hydraulic pump piston 252. Pump piston 252 is housed in pump cylinder 254 and is reciprocated by hydraulic pump 256 by providing hydraulic fluid pressure to one side or the other of the piston 252. Electric motor 174 may be used to power pump 256.

The steering assembly 20 of the present invention permits the direction of the bit 12 to be changed while drilling. Belleville springs 184, 186 provide a spring loaded connection providing a preload on wedge members 90. This Belleville spring force allows cam surfaces 86, 96 to maintain contact as one wedge 90 moves axially upward off of angle cam 80 and/or another wedge 90 moves axially downward to apply a downward force onto angle cam 80. If hydraulic pressure is relieved on large pistons 176, then the lower set of Belleville springs 186 expands one side of the spring loaded connection. If hydraulic pressure is increased on large pistons 176, then the upper set of Belleville springs 184 expands the other side of the spring loaded connection.

Belleville springs 184, 186 maintain a predetermined amount of load on cam surfaces 86 of angle cam 80 by wedge surfaces 96 of wedge members 90 during a change in drilling direction so that the vibrations caused by the bit 12 do not tear up the bottom hole assembly 10. During drilling, there is a high dynamic shock load placed on the wedge members 90 by the drilling action of the bit 12. For example, the bit 12 tends to grab and let go of the formation as it is drilling. Upon adjusting the angle and direction of the angle cam 80, the Belleville springs 184, 186 maintain a load between the surfaces 96 of wedge members 90 and surfaces 86 of angle cam 80. If the surfaces 86, 96 do not maintain contact, the drilling action of the bit 12 will destroy cam surfaces 86, 96.

The Belleville springs 184, 186 also allow the wedge members 90 to be backed off of angle cam 80 if too great a load is applied to angle cam 80 by wedge members 90 such that the assembly becomes wedged or locked. If the bit 12 gets hung up, then the wedge members 90 can be backed off of the angle cam 80. Because the wedge angle is 10° or more, there may be a point where the wedge members 90 tend to lock onto the angle cam 80. If the steering system begins to stall or lock up, a cyclic load can be applied to the wedge members 90 to move the wedge members 90. The Belleville springs 184, 186 allow movement of the wedge members 90 approximately 0.025 of an inch to cause the system to become unwedged. The shock load from the bit 12 tends to move the wedge members 90 back to unlock the system. When the wedge members break free, the electric motor 174 can move the wedge members 90 upwardly and out of contact.

When not in use, the Belleville springs 184, 186 are loaded up into their fully collapsed position. The spring load of the Belleville springs 184, 186 in their collapsed position is about 600 pounds. For example, once the steering assembly 20 has moved to a new direction and bend angle, the Belleville springs 184, 186 are bottomed out since the Belleville springs 184, 186 are not needed for bit vibrations once the wedge members 90 are in their set position. The Belleville springs 184, 186 do not assist at that time. Further, if changes in direction are made while drilling has been stopped, the Belleville springs 184, 186 would not be needed.

Further, a fail safe system may also be part of steering assembly 20 such that if there becomes a problem with moving the wedge members 90 to control the angle cam 80, the wedge members 90 can all be disengaged and moved away from the angle cam 80. This allows the removal of any excessive loads at the angle cam 80 due to bit side load so that a much lesser force or electric motor torque may be used to readjust the wedge members 90. The fail safe system can be a hydraulic piston located above the electric motors 174 which has a large outside diameter sealed to the mud piston housing inside diameter and below that large diameter has a smaller outside diameter also sealed to the housing with the mud piston housing having an opening to the outside or the bore hole pressure between the two sealed surfaces. The piston is biased towards the drilling motor power section by a coil spring, possibly between the sealed surfaces. The piston is connected to the wedge body 156 below by at least three rods so that when there is a predetermined pressure drop (for a bottom hole assembly with a bit below with nozzles usually a mud flow rate through the tool), the piston is forced down against a stop and thus moves the wedge body along with the three wedge members a predetermine distance of between two inches and a 1/32 of an inch. The fail safe system can also be a piston located above that is connected to the wedge body 156 hydraulically through a tube or tubes from the piston to the wedge body 156 between the electric motors 174. The wedge body 156 would be sealed to the housing 26 and to an inside diameter sleeve so that hydraulic pressure from the piston above would force the wedge body 156 down until a stop prevents further axial movement.

Still another fail-safe system includes springs and/or dampeners between the wedge member 90 and larger piston 176 of the hydraulic amplifier 170. These are located so that a force against the wedge member 90 by the larger piston 176 in either direction would allow for a predetermined amount of movement between them. The electric motor places a force on the wedge member 90 in the direction desired with the ability to move a small amount so that when a momentary reduction of bit side load against the formation occurs from downhole vibrations, the wedge member 90 can move a slight amount. The electric motor 174 can be turned on periodically to put an axial load on the wedge member 90 to continue its movement until the bit side load becomes small enough so that the electric motor 174 can move the wedge member 90 as needed.

In changing drilling direction, such as bend angle and/or angular orientation around axis 72, interim adjustments are made in the axial position of the wedge members 90. For example, one wedge member 90 is not completely disengaged from angle cam 80 and then another wedge 90 moved downwardly to increase the force it applies to angle cam 80. The engagement changes are made incrementally in small steps.

Upon assembly, all three wedge surfaces 96a, 96b, and 96c of wedge members 90 are loaded fully against the tapered surfaces 86a, 86b, and 86c, respectively, of angle cam 80 with surfaces 86, 96 contacting each other at contact areas 260, 262, respectively. When the wedge members 90 are all loaded in their downward position against surfaces 86, compression of the Belleville springs 184, 186 allows an axial movement of up to 0.025 of an inch. For example, when one wedge 90 is moved off of the angle cam 80, the contact areas 260, 262 shift while a predetermined load remains due to Belleville springs 184, 186. One or more of the wedge members 90 individually may then adjusted axially by drive train 150 to achieve the desired direction and angle for bit 12. For example, one wedge 90 may be moved upward 0.020 of an inch and then another wedge 90 moved downwardly 0.020 of an inch during drilling with Belleville springs 184, 186 maintaining a continuous force on the wedge members 90 at contact areas 260, 262 against the angle cam 80.

The relative positions of the three wedge members 90 are determined by the surface processor 514 to achieve the desired direction and bend angle of the bit 12. For example, the surface processor 514 may include a lookup table having three or four hundred directional positions, each corresponding to a certain drilling direction having a particular bend angle and angular orientation about axis 74 for the bit 12. Each drilling direction in turn has a particular set of axial positions for each of the three wedge members 90. The surface processor 514 also provides the relative axial adjustment of the three wedge members 90 to achieve a new direction and angle of drilling. Thus, a set of positions for the wedge members 90 is dictated by the lookup table for a particular direction and angle of drilling.

Although the steering assembly 20 is infinitely variable, the lookup table only has a finite number of directional positions for the bit 12. Since directional drilling itself is not a precise art, a finite number of positions of the bit 12 is sufficient. Also, multiple adjustments may be made to the steering assembly 20 to ensure that the bit 12 is drilling in the desired direction.

Referring again to FIGS. 3A–E, a potentiometer 270 is housed in upper housing 26 adjacent each of the wedge members 90 to determine and verify the exact position of each wedge member 90. Best shown in FIG. 3B, a linear potentiometer 270 is disposed in an axial bore 272 in wedge body 156. A potentiometer rod 274 extends downwardly from the potentiometer body 270 with the lower end of the rod 274 attached by a fastener 276 to one of the wedge members 90. The upper end of the potentiometer 270 is attached within wedge body 156 by another fastener 278. An aperture 280 extends through bottom spacer 124, middle spacer 126 and upper spacer 128 through which passes one or more electrical conductors (not shown). The electrical conductors extend around the electric motor 174 in motor housing 104 to the electrical connectors 230 located above electric motor 174 and then to the electronics package 18. As a wedge 90 moves axially, the attached potentiometer rod 274 also moves thereby changing the resistance within the potentiometer 270. Each potentiometer 270 provides a signal to the surface of the longitudinal position of each wedge member 90 providing a measurement of the travel of the wedge member 90 with respect to the housing 26. Thus, the three potentiometers 96 show the relative positions of wedge members 90 which determine the plane formed by the areas of contact 260, 262 between the wedge members 90 and angle cam 80.

Figure 11A:
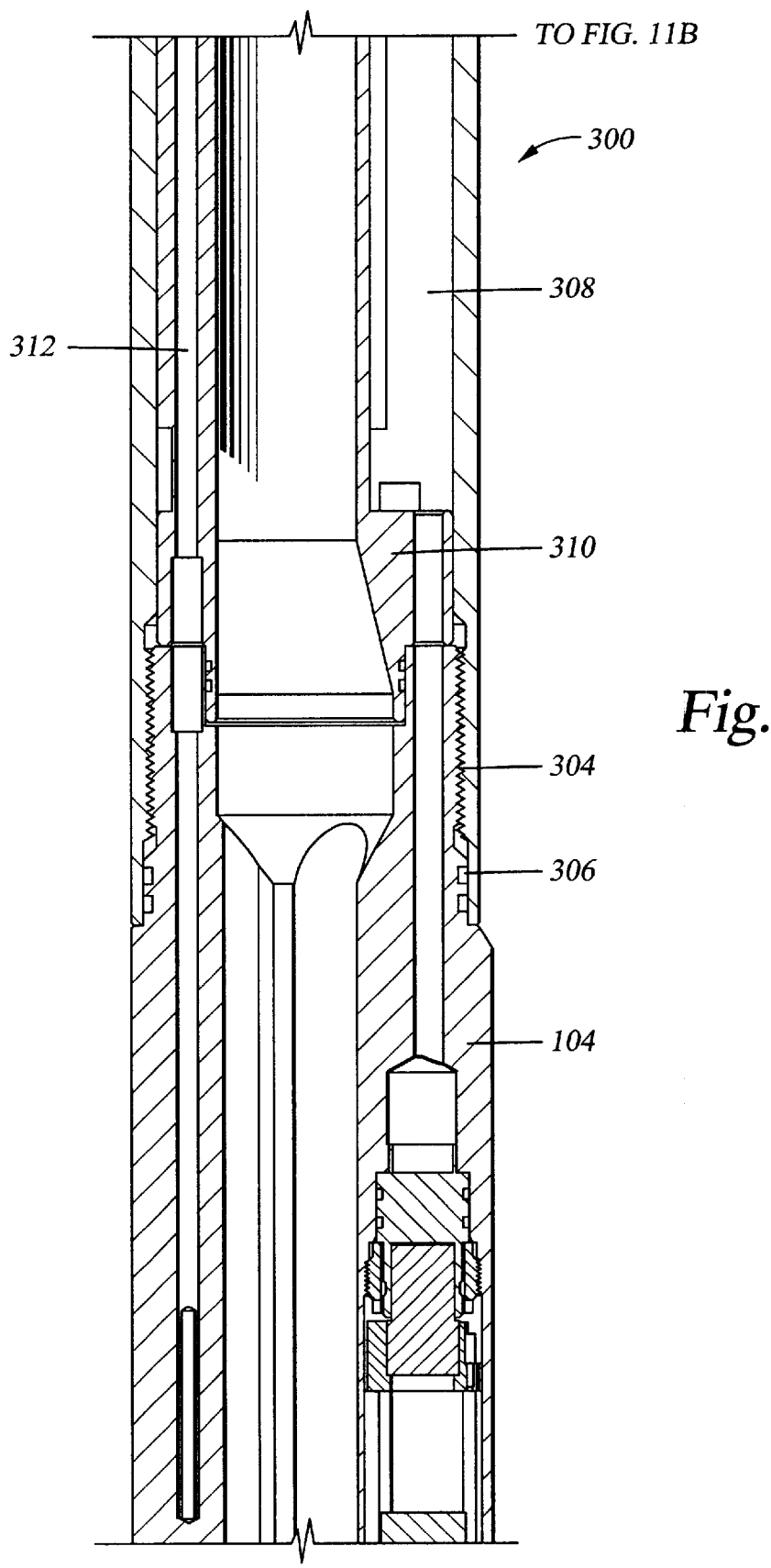
Figure 11C:
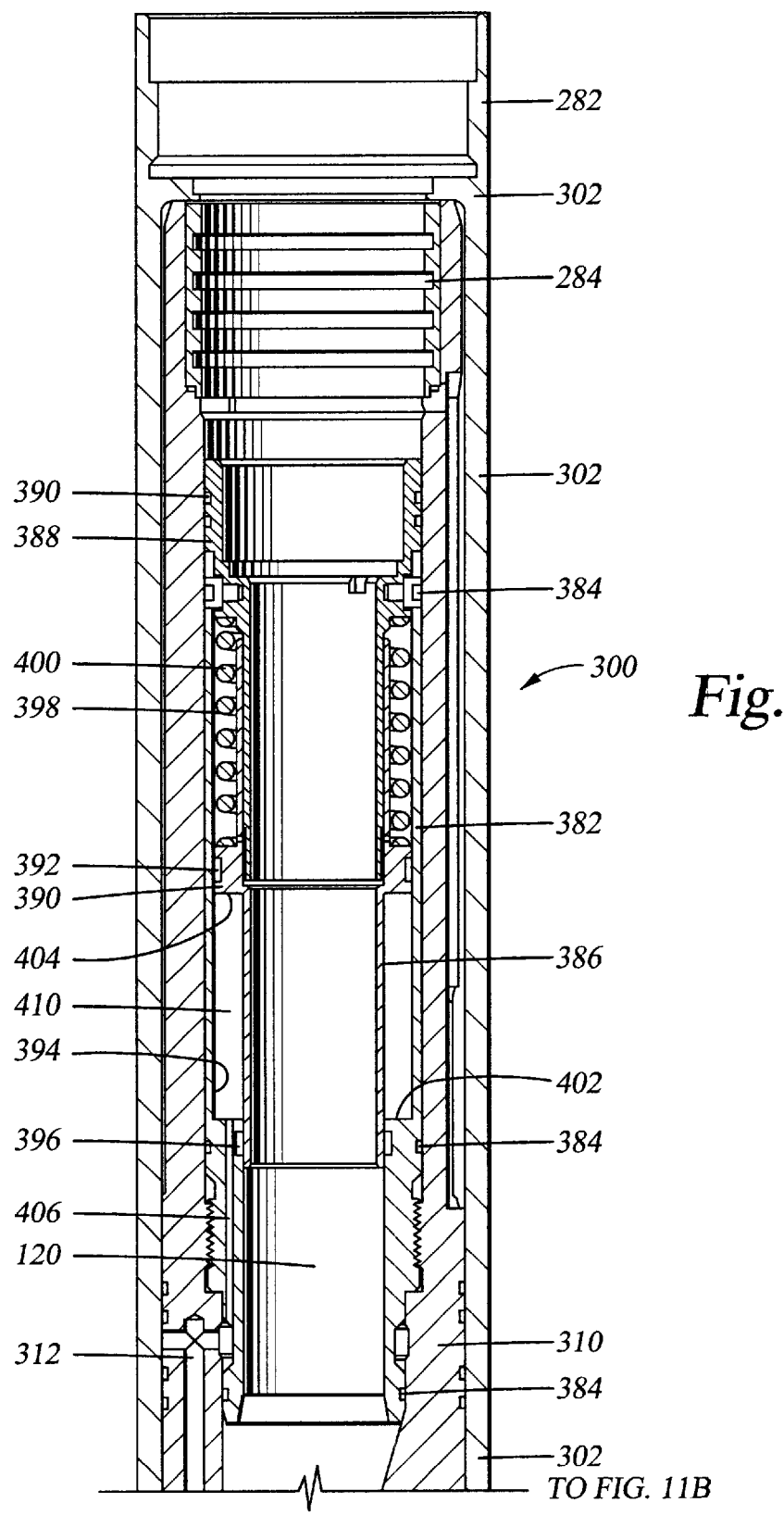

The signal from a particular potentiometer 270 is then transmitted to the surface 11 by electronics package 18. The signal is preferably transmitted to the surface 11 through data transmission conductors 584, 586 in composite coiled tubing 520 shown in FIG. 15. Alternatively, the signals could also be transmitted to the surface along a wet path. Various transmitters may be used for transmission. As best shown in FIG. 11C, there are four metal rings 284 at the upper wet stab connector 282 of assembly 10. Once the connection is made up, contact is made with the individual rings 284 allowing wet path transmission to the surface as is well known in the art. The signals are then processed at the surface by surface processor 514 to determine the positions of each of the three wedge members 90 and thus determine the trigonometry of the plane formed by the contact areas 260, 262. The position of this plane with respect to true vertical and azimuth, as determined by the inclinometer 24, sets the true angle and direction of drilling. Alternatively, it should be appreciated that the position of the wedge members 90 relative to the angle cam 80 could be monitored by a linear potentiometer fixed to the housing 26 and measuring the movement of the pistons 176, 178 or the movement of the drive shaft screw 200.

Although the potentiometers 270 determine the plane formed by the three wedge members 90, in reality, the bit 12 may not be drilling a true hole, i.e. in the desired direction, because it is sliding within the borehole in the formation, as for example because it is drilling in a soft formation. Thus, even though the three wedge members 90 are properly positioned, their directional position may not reflect the actual direction of drilling of the bit 12. Thus, it is preferred to use the near bit orientation sensor 556 in the bottom hole assembly 10 to monitor inclination from true vertical and monitor the azimuth of the bottom hole assembly 10 so that the bore hole path close to the bit 12 can be adjusted while drilling to maintain the drilling path near the desired direction or well path.

The inclinometer in the near bit orientation sensor 556 measures direction based on the earth's gravity while the potentiometer 270 merely measures the axial extension of wedge members 90. The bottom hole assembly 10 can be made from non-magnetic metal so that inclination and azimuth can be easily and correctly sensed. The orientation package 554 includes survey grade instruments to accurately record the direction of drilling and also serves as another check on the actual direction of drilling to that of the near bit orientation sensor 556 and the potentiometers 270. The orientation package 554 indicates exactly where the bit 12 is located. In other words, the potentiometers 270 indicate theoretically the direction of drilling and the near bit orientation sensor 556 indicates approximately the direction of drilling while the orientation package 554 indicates the actual direction of drilling.

Other sensors or sensing systems 552 may be used in order to monitor the position of the wedge members 90. For example, one of several sensing devices may be used to count the direction and number of rotations of the drive shaft 208 of the electric motor 174 to determine the axial position of the wedge members 90. Also the position of the wedge members 90 relative to the housing 26 can be indirectly monitored through the hydraulic multiplier 170. Further, the position of the wedge members 90 can be determined directly periodically by bringing the wedge members 90 against a stop on the wedge body 156 and re-zeroing the turns on the electric motor 174. A simpler sensor, such as a pressure sensor, could be used to measure the pressure applied to the large pistons 178.

Figure 12:
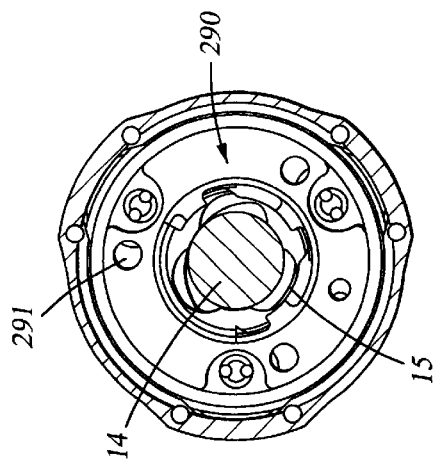
FIG. 12 is a cross-sectional view of the motor drive shaft centralizer taken at section 12—12 of FIG. 3D.
Figure 10:
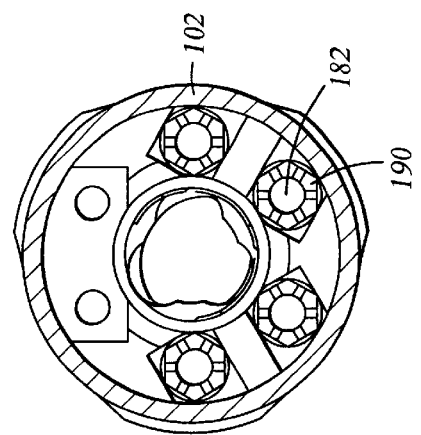
FIG. 10 is a cross-sectional view of the of the lower ends of the large pistons of the hydraulic amplifier taken at section 10—10 of FIG. 3B.

Referring now to FIGS. 3D and 12, a centralizer 290 is disposed in a counterbore 292 in the lower terminal end of upper spacer 128 and is held in place by the upper terminal end of middle spacer 126. The centralizer 290 is disposed within housing 26 near the center of drive shaft 14. Drive shaft 14 has an upset 15, shown in FIG. 12, disposed on shaft 14 so as to be centered on and engage the centralizer 290. This allows the centralizer 290 to support the drive shaft 14 near its medial portion. Apertures 291 are shown for the passage of electrical conductors.

Referring now to FIGS. 1A–C, the steering assembly 20 includes a fluid pressure compensation system 300 mounted on the upper end of motor housing 104 to compensate for any pressure variation in closed fluid chamber 320 of the steering assembly 20. The compensation system 300 includes a pressure housing 302 threaded at 304 and sealed at 306 to the upper end of motor housing 104. A pressure housing sleeve 310 is disposed within housing 302 to form a cavity 308 for housing the near bit orientation sensor 556 including inclinometer 24, electronics package 18 and various electrical conduits.

Figure 13A:
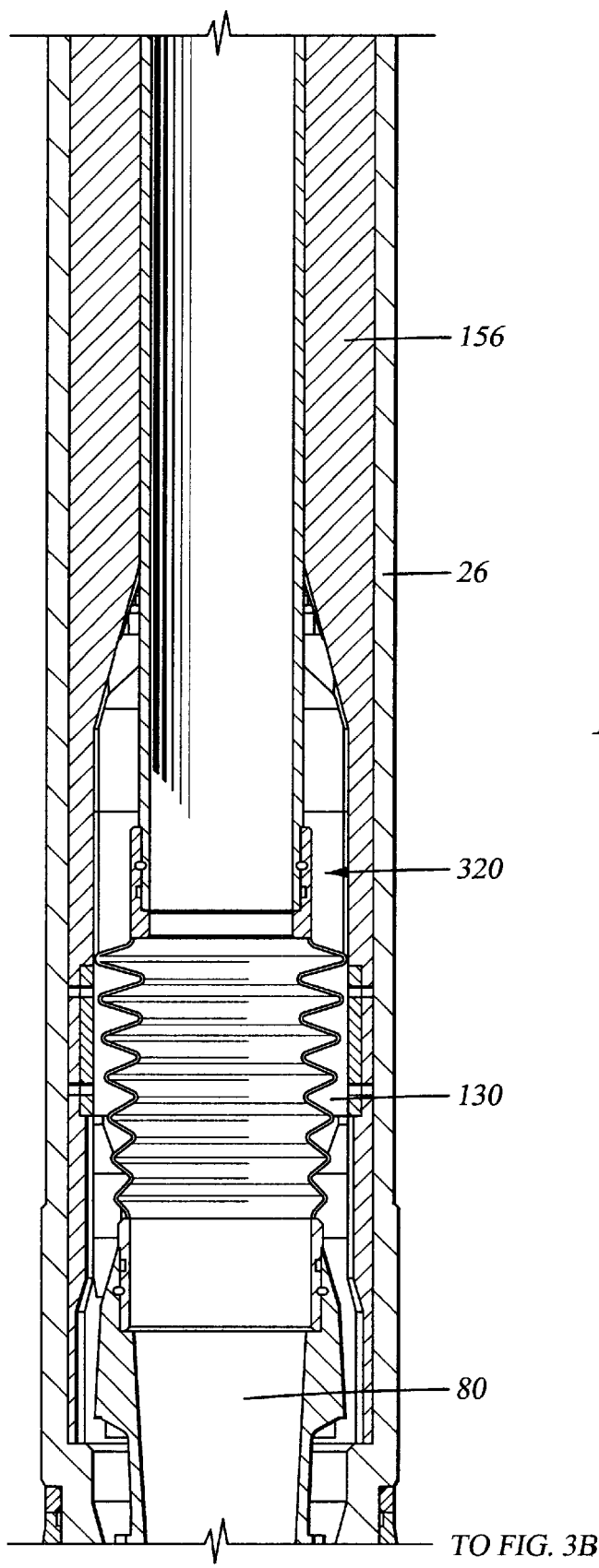
FIGS. 13A–C are a cross-sectional view of the steerable assembly showing a portion of the pressure compensating system from the angle cam to the middle spacer taken at section 13—13 of FIG. 2.
Figure 13B:
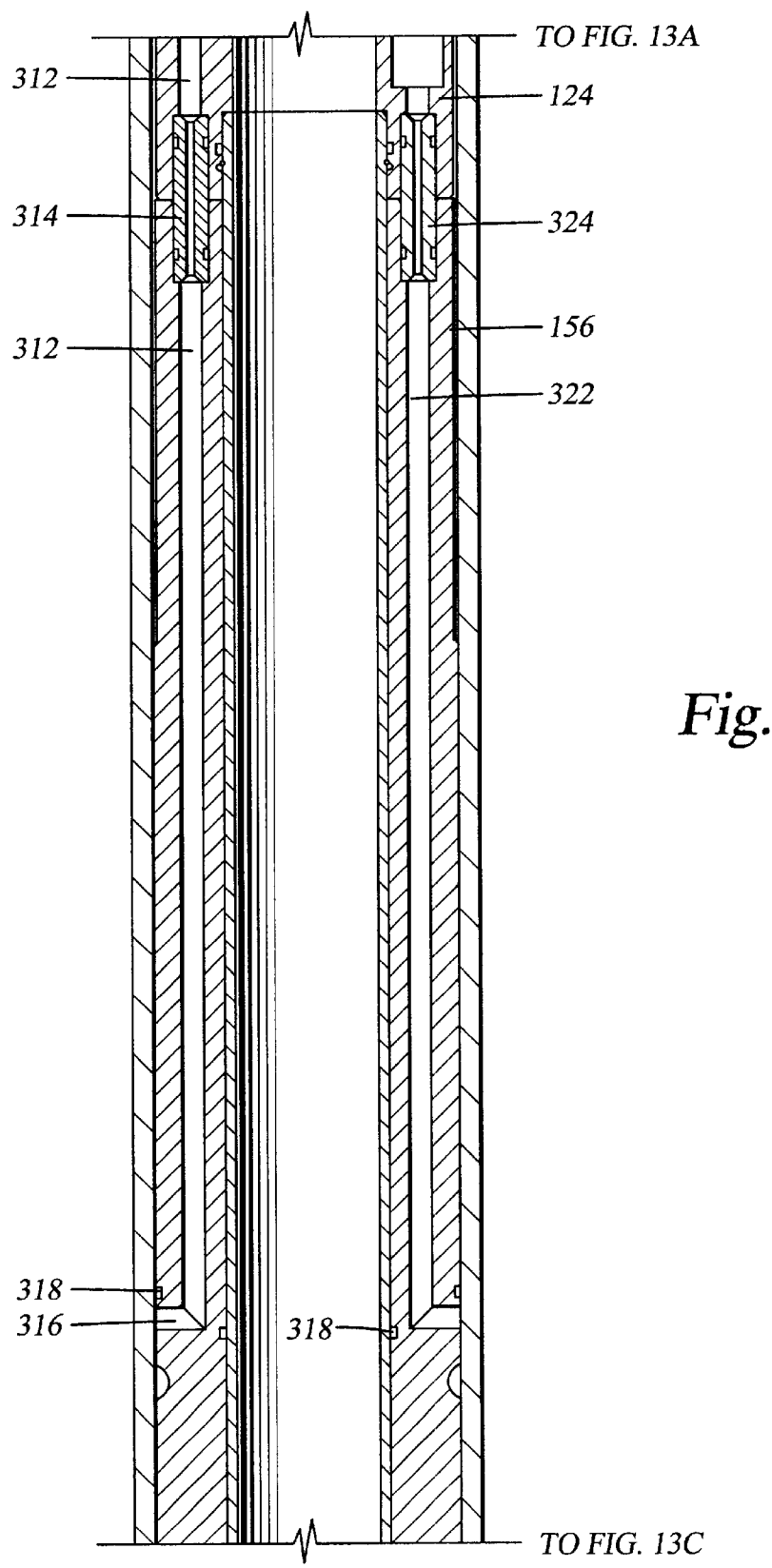
Figure 13C:
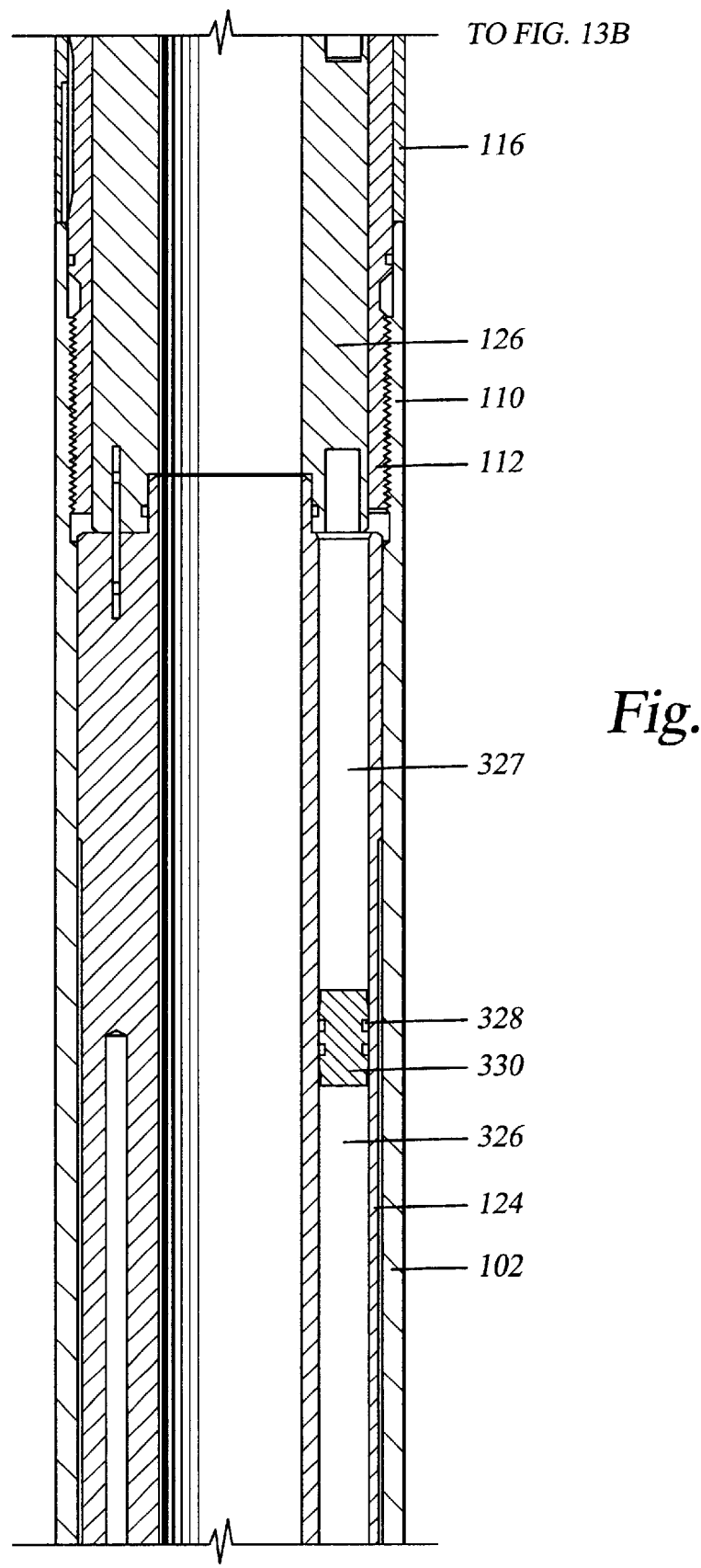

Referring now to FIGS. 11A–C and 13A–C, closed fluid chamber 320 includes an oil passageway 312 which extends from the upper end of pressure housing sleeve 310, through motor housing 104, upper spacer 128, and middle spacer 126 to lower spacer 124 shown in FIG. 13C. The oil passageway 312 continues through a seal plug 314 at the interface of lower spacer 124 and wedge body 156 and into the wall of wedge body 156. Seals 318 seal between wedge body 156 and housing 26. The oil communicates from the lower end 316 of oil passageway 312 down to annular area 130 around the lower ends of wedge members 90 and angle cam 80.

Closed fluid chamber 320 also communicates annular area 130 with an oil passageway 322 in wedge body 156, through seal plugs 324 at the interface of lower spacer 124 and wedge body 156 and into an oil chamber 326. An oil isolation piston 330 is disposed within chamber 326 and includes seals 328 for sealing with the wall of chamber 326. That portion 327 of the oil chamber 326 above piston 330 communicates with the bores 162 and 174 housing the drive train 150 and potentiometers 270, respectively. Oil isolation piston 330 oscillates to compensate for the movement of drive shaft 200. The closed fluid chamber 320 is capable of sealing against differential pressures as high as 2000 psi between the closed fluid chamber 320 and the drilling fluids flowing through flowbore 120.

Figure 14:
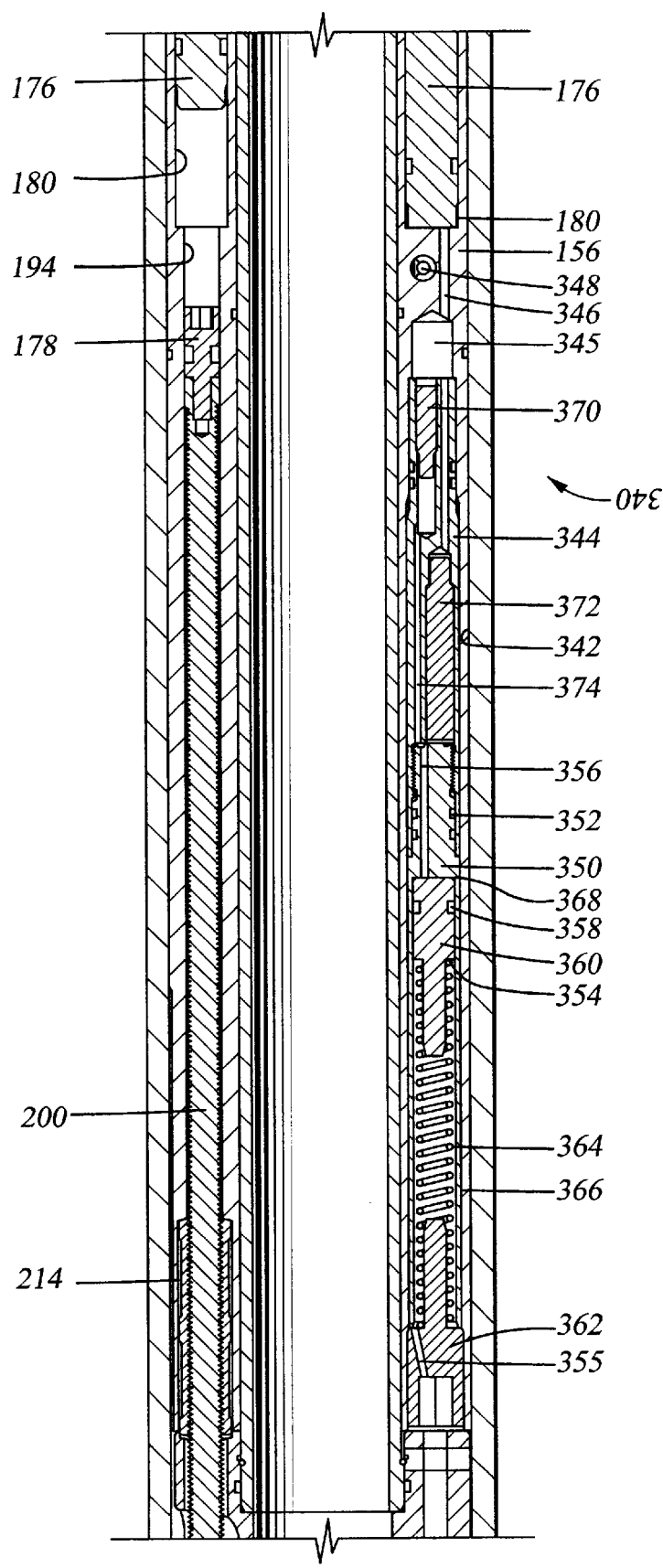
FIG. 14 is a cross-section of the pressure relief system for the hydraulic amplifier shown in FIGS. 3B–C.

Referring now to FIG. 14, a pressure relief system 340 is housed in a bore 342 in wedge body 156 to relieve over pressure in the closed hydraulic system formed by cylinders 194 and 180 between small piston 178 and large pistons 176 of the hydraulic amplifier system 170. Pressure relief system 340 includes a relief valve 344 having its lower end in fluid communication with a chamber 345 in wedge body 156. Chamber 345 is in fluid communication, such as through communication bore 346, with closed hydraulic cylinders 180 and 194.

Pressure relief system 340 also includes a mandrel 350 having its lower end sealingly mounted at 352 in the upper end of valve 344. Mandrel 350 includes a cylinder 354 having a fluid port 356 extending from its lower end to valve 344. A compensating piston 360 is sealingly disposed at 358 within cylinder 354 forming an upper chamber 366 and a lower chamber 368. Lower chamber 368 is in fluid communication with communication bore 356 and thus with valve 344. The upper end of cylinder 354 is in fluid communication with chamber 326 (above isolation piston) by a relief port 355 through plug 362 with a spring 364 disposed within cylinder 354 and bearing against the plug 362 and one side of the piston 360.

Pressure relief valve 344 includes a check valve 370, such as a "187 Zero Leak Chek" valve, and a high pressure valve 372, such as a "250 TRI" valve. The upper end of check valve 370 communicates with lower chamber 368 via port 374 and port 356 and the lower end of check valve 370 communicates with port 346 and thus cylinders 180, 194 for small piston 178 and large pistons 176. Check valve 370 permits the release of fluid pressure from lower chamber 368 to wedge chamber 345. High pressure valve 372 permits the release of high fluid pressure from wedge chamber 345 to lower chamber 368.

In operation when the pressure in hydraulic amplifier system 170 and wedge chamber 345 exceeds a predetermined limit such as due to downhole temperatures, for example, the high pressure relief valve 372 opens allowing fluid into lower chamber 368. This causes compensating piston 360 to move upwardly in upper chamber 366 thereby compressing spring 364 and relieving the over pressure in wedge chamber 345 and thus cylinders 180, 194. The increase in fluid pressure in upper chamber 366 is bled into that portion of the oil chamber 326 above piston 330. Check valve 370 allows fluid pressure from lower chamber 368 to pass into wedge chamber 345 and cylinders 180, 194 upon the pressure in wedge chamber 345 and cylinders 180, 194 going down as when the wedge members 90 back off of the angle cam 80. The pressure relief system 340 allows a constant volume to be maintained in the wedge chamber 345 and the closed hydraulic system of cylinders 180, 194 between small piston 178 and large pistons 176.

It should be appreciated that alternative pressure relief systems may be used. For example, a spacer member may be disposed in upper chamber 366 with a basing member, such as Belleville springs, biasing the spacer member against spring 364 whereby if wedge chamber 345 and cylinders 180, 198 bleed so that compensating piston 360 engages the spacer member, increased pressure will be required to bleed additional fluid.

Referring again to FIG. 11C, compensating system 300 includes a compensating cylinder 382 sealingly mounted at 384 in the upper end of pressure housing sleeve 310 and a compensating piston 386 reciprocably mounted within cylinder 382. A closure sleeve 388 is received in the upper end of cylinder 382 and sealingly engages pressure housing sleeve 310 at 392. Closure sleeve 388 and piston 386 are cylindrical members allowing drilling fluids to pass therethrough. Piston 386 also includes an annular flange 390 housing a seal 392 in sealing engagement with the wall of cylinder 382. Piston 386 has its lower end disposed in a counterbore 394 in cylinder 382 which has a seal 396 in sealing engagement with piston 386. Closure sleeve 388 and cylinder 382 form an annular area 398 housing a spring 400 which bears against the annular flange 390 of piston 386. The cylinder 382 forms an upwardly facing annular shoulder 402 and flange 390 forms a downwardly facing annular shoulder 404, which together with cylinder 382 and piston 386 form a compensating fluid reservoir 410. A common communication flow link 406 extends from the compensating fluid reservoir 410 down to oil passageway 312 forming a part of closed fluid chamber 320. Spring 400 biases piston 386 downwardly causing piston 386 to place a small predetermined pressure on the oil in oil reservoir 410 which in turn is in fluid communication the closed fluid chamber 320 with all of the moving parts in the steering assembly 20 being housed within a closed fluid chamber 320.

Spring 400 places a slight amount of downward pressure on piston 386 to ensure that the pressure in annular area 130 and annular oil chamber 326 is greater than the pressure of the drilling fluids passing through central flowbore 120 such that the oil tends to flow out of closed fluid chamber 320 rather than drilling fluids or well fluids tending to flow into closed fluid chamber 320. Thus, a slight positive pressure is maintained within closed fluid chamber 320.

It can be seen that alignment is very important during the assembly of steering assembly 20. Once the angle cam 80 is in position, all of the parts above it must be properly aligned with respect to cam surfaces 86 on angle cam 80. This requires that assembly occur principally by axial insertion rather than by rotational connection. The cam surfaces 86 of angle cam 80 are initially aligned with the mating splines 94 in the knuckle ball 32 connected to lower housing 28. Then the wedge body 156 with the cam surfaces 96 of wedge members 90 must be aligned with the arcuate cam surfaces 86 of angle cam 80. The wedge body 156, hydraulic amplifier 170, spacers 124, 126, 128 and expandable/contractable connection 204 are all then made up together as a package. Once the package is assembled, these components are installed as a package into upper housing 26 by inserting the package axially into upper housing 26. Upper housing 26 is then connected to lower housing 28 by turn buckle 116.

The steering assembly 20 of the present invention steers by controlling the bend angle and the angular direction of the lower housing 28 around axis 74 upstream from the drill bit 12 while the bit 12 is drilling. By using a bend in the bottom hole assembly 10 as an offset above the drill bit 12, the bottom hole assembly 10 can be used to push the bit 12 against the bore hole. Also, because an angle is created between the bit 12 and the bottom hole assembly 10, the bit 12 is pointed in the direction that the bore hole is to be drilled. The offset from the bend is increased by increasing the angle so that an over sized hole (larger than the drill bit 12) can be compensated for by making the angle larger so that there is a side load against the bore hole.

The steering system 20 of the present invention includes a communication system that monitors directional data from the downhole sensors and provides commands to the steering assembly 20 to change the angle and direction of drilling. The communication system allows data to be sent to the surface for analysis by the surface processor 514 and for the surface processor 514 to send commands to the steering assembly 20 for readjusting the wedge members 90 as needed to steer the drilling of the bit 12 in the desired direction of the borehole. Such adjustments may be made by comparing the actual wedge member positions, the angle and azimuth of drilling and the true direction of the bit 12 to a predetermined bore hole path or some other parameters or by taking commands transmitted from the surface. Also, the system may have the capability of learning the setting required to obtain the desired direction by comparing previous settings and results for the particular hole and/or formation being drilled. Thus the communication system allows communication between the surface and the steering assembly 20 preferably through electric conductors 584, 586 in the wall of the composite coil tubing 520 for the present invention to become an electrically controlled bent sub.

Figure 15:
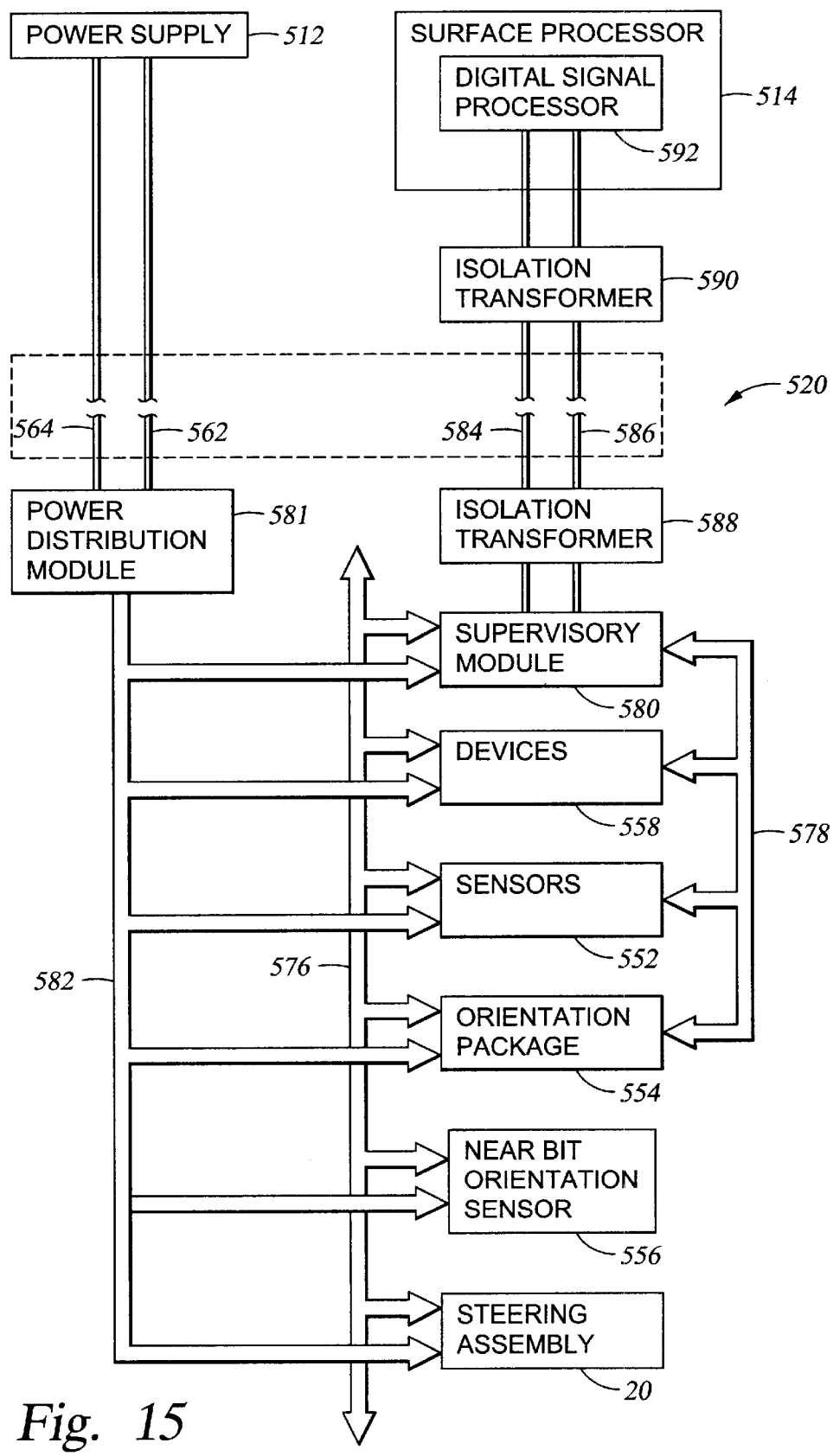
FIG. 15 is a functional block diagram of the electronic controls of the steering assembly.

For example, referring now to FIG. 15, there is shown a schematic of the electronic control system 530 for the bottom hole assembly 10 including particularly steering system 20. The system 530 includes a plurality of downhole data acquisition devices such as sensors 552, orientation package 554, and near bit orientation sensor 556. Also included are a plurality of control devices such as devices 558 and steering assembly 20. It should be appreciated that sensors 552 and control devices 558 may not only include the sensors and control devices described herein but other data collection and measurement sensors and control devices well know in the art. A power supply 512 provides power to a power distribution module 581 through power lead 562 and power return 564, a substantial length of which extend through the wall of composite coiled tubing 520. Power distribution module 581 distributes power to the various components 552–560 and 580 in the bottom hole assembly 10 via a power bus 582.

A "slow" data bus 576 provides a command and data communication path between the various components 552–560, 581 and a supervisory module 580, preferably housed in supervisory sub 672. Microcontrollers in each of the components can communicate with each other via the slow bus 576. A "high speed" data bus may also be provided between the supervisory module 580 and data acquisition devices such as orientation package 554 and sensors 552. An example of a suitable high speed data bus may be a 1553 wireline data bus that is commonly used for wirelines.

The slow data bus 576 and high speed data bus 578 are connected to the supervisory module 580 which acts as a downhole controller for all downhole data acquisition devices and control devices. Supervisory module 580 is coupled by a transformer 588 to data conduits 584, 586 extending through the wall of composite coiled tubing 520 to a second transformer 590 at the surface. At the upper end of composite coiled tubing 520, transformer 590 couples data conduits 584, 586 to a digital signal processor 592 housed within surface processor 514. Transformers 588, 590 provide direct current isolation to protect uphole and downhole electronics from electrical faults in data conduits 584, 586.

The digital signal processor 592 is a programmable device in the surface processor 514 which serves as a modem (modulator/demodulator) at the surface. Digital signal processor 592 preferably includes analog-to-digital conversion circuitry to convert received signals into digital form for subsequent processing.

Each downhole data acquisition device and control device has a modem with a unique address from data busses 576, 578. Each modem may communicate individually and directly with the surface processor 514 using its unique address. Surface processor 514 can initiate communications with a particular device's modem by sending a message to the unique address. The modem responds by communicating an acknowledgment to the surface. This allows the surface to communicate with each of the downhole control devices and data acquisition devices. The downhole-surface communications preferably occur serially over data conduits 584, 586. The command signals down to the power distribution module 581 directs the power to the appropriately designated downhole device.

Generally no signal is sent downhole requesting that the data from the data acquisition devices be forwarded to the surface. Typically data from the data acquisition devices is constantly being communicated to the surface in a coded stream which can be read or ignored as desired at the surface. The high speed data bus 578 is normally reserved for data communications. All of this data is in digital form.

The commands from the surface to the downhole control devices are preferably sent down a time- or frequency-multiplexed channel on data conduits 584, 586. It should be appreciated that these communications may alternatively be sent down the power leads 562, 564. In their simplest form, the command may simply be on and off signals. These can also be frequency multiplexed on the power leads so that the signals do not interfere with the power transmission on the power conduits 562, 564.

The electrical power on power conduits 562, 564 is preferably provided in the form of direct current. Preferably, power leads 562, 564 are only used for power, and all data and commands are sent through data conduits 584, 586.

Although a certain amount of data processing may occur downhole in some of the devices, it is preferred that the bulk of the data processing occur at the surface. Some of the data is initially conditioned downhole prior to being forwarded to the surface. Each control device downhole includes a microprocessor which acts as a controller. These microprocessors are normally not used for the processing of data. Such downhole processing is unnecessary since more than adequate bandwidth is provided to send all data to the surface for processing.

All of the downhole devices are electrically powered from the surface and are all electrically power actuated. Although some downhole control devices may have hydraulic components, such components are preferably electrically controlled.

The surface processor 514 directs the three electric motors 174 of the steering assembly 20 to actuate and power the hydraulic amplifiers 170. These hydraulic amplifiers 170 actuate and reciprocate the three individual wedge members 90 engaging an angle cam 80 for adjusting the bend angle and direction of the nose 28 on the steering assembly 20 and thus bit 12. Each wedge member 90 has various positions which triangulates the engagement with the angle cam 80 so as to dictate a particular bend angle and direction of the tool face of the bit 12.

The near bit orientation sensor 556 is preferably located in the housing of the steering assembly 20. The near bit orientation sensor 556 preferably includes an inclinometer and magnetometer for providing an early indication of the direction of drilling of the bit 12. The near bit orientation sensor 556 also confirms a change in the direction of drilling after a command has been sent downhole to alter the angle and/or direction of the tool face of the bit 12. Approximately every ten seconds, the data from the near bit orientation sensor 556 is sent to the surface via the slower serial bus 576, supervisory module 580, and data conduits 584, 586. The data from the near bit orientation sensor 556 is utilized as a progress check for the direction of drilling.

A survey grade orientation package 554 is disposed above the near bit orientation sensor 556, typically by 30 or 40 feet. The survey grade orientation package 554 may include the HDAS (Develco) orientation sensor. The orientation package 554 typically includes three magnetometers and three inclinometers, along with other sensors for determining temperature and other downhole characteristics. The data from the orientation package 556 typically includes three magnetometer measurements, three inclinometer measurements and temperature. This data is sent to the surface via the high speed bus 578 approximately once a second.

The supervisory module 580 serves as the controller for the bottom hole assembly 10. The supervisory module 580 basically serves as a bus master and might be considered the hub of the downhole activity. It takes commands from the surface and retransmits them to the individual downhole devices. The supervisory module 580 also receives acknowledgements and data from the individual downhole devices and retransmits them to the surface processor 514 at the surface. The commands and data are preferably provided in a frame format that allows the supervisory module to efficiently multiplex and route the frames to the desired destination. The supervisory module 580 preferably transmits information to the surface using quadrature amplitude modulation (QAM), although other modulation schemes are also contemplated. Currently the QAM modulation provides a 65 kilobit per second transmission rate, but it is expected that transmission rates of 160 kilobits per second or greater can be achieved. The commands transmitted from the surface processor 514 to the supervisory module 580 are preferably sent using a frequency-shift keying (FSK) modulation scheme that supports a transmission rate of approximately 2400 baud.

The surface processor 514 includes a computer having one or more algorithms for calculating the bend angle and angular orientation of the tool face of the drill bit 12 downhole. These algorithms in the surface processor 514 are used to command the individual motors 174 and the steering assembly 20 to adjust the bend angle and direction of the nose 28. Algorithms for the surface processor 514 are advantageously easier to write and revise than algorithms for downhole microprocessors. It should be appreciated that a lookup table may be incorporated in surface processor 514 to determine the individual positions of the wedge members in steering assembly 20 desired for obtaining a particular bend angle and direction.

The surface processor 514 provides a way to "close the loop" between the data acquisition devices and the downhole control devices. The surface processor 514 can direct the downhole control devices to perform an action and observe the results. If the results are not what was expected, or if the data acquisition devices indicate the need for a different action, then the surface processor 514 can direct the control devices to adjust their actions accordingly. This form of feedback enables precise control and a fast response to changing drilling conditions.

It should be appreciated that alternatively, electric power may be generated downhole rather than supply from the surface. For example, an electric turbine may be disposed in the bottom hole assembly which generates electricity as mud flows through the turbine.

Figure 16:
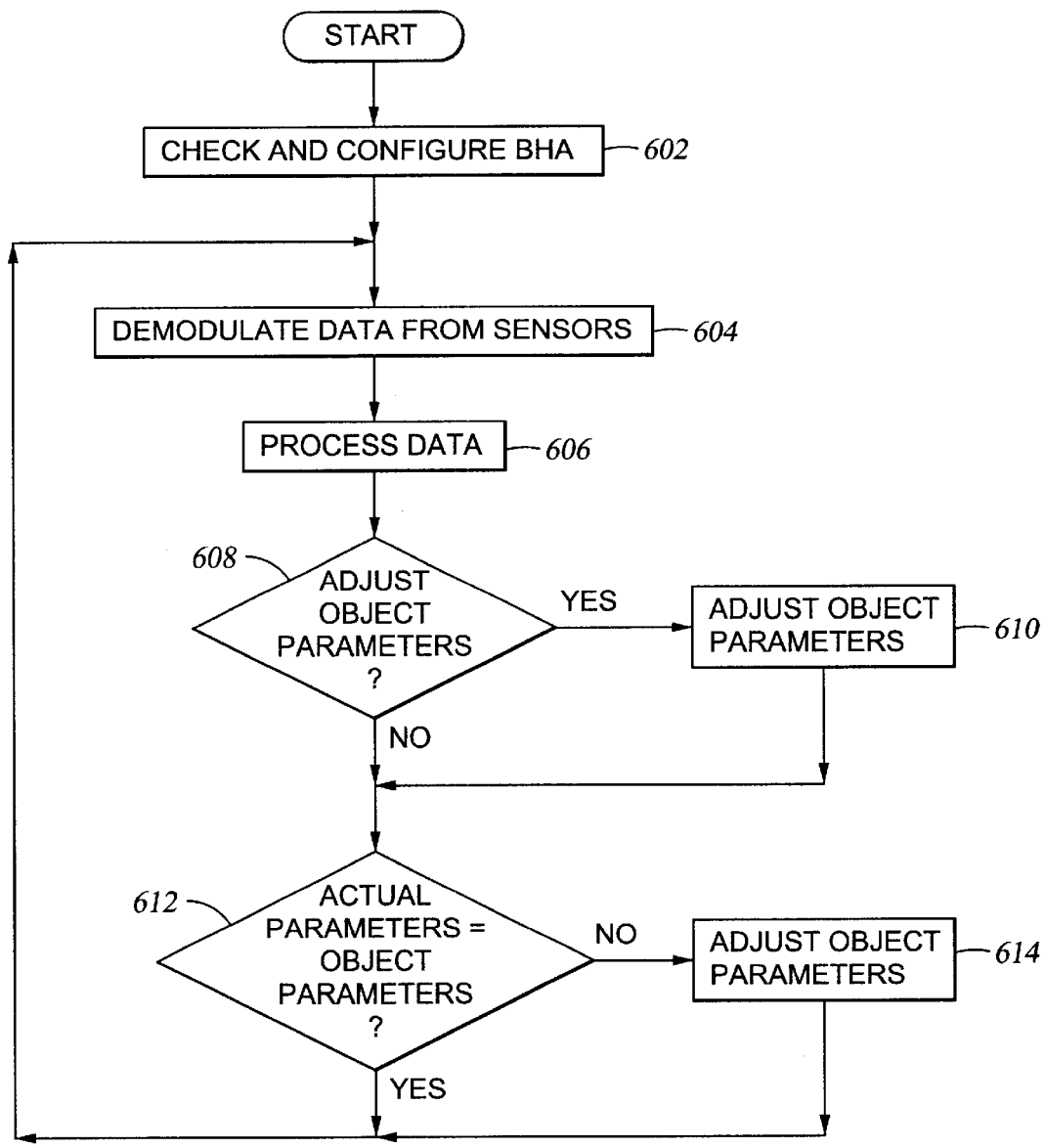
FIG. 16 is an exemplary flowchart of processing of data and the transmission of commands between the surface processor and the electronic sensors and controls of the steering system.

Referring now to FIG. 16, a flow diagram is shown for the process executed by the surface processor 514. In block 602, the surface processor 514 issues commands to the bottom hole assembly to verify the settings and operability of the various components and to place the components in a desired initial configuration. The sensors 552, orientation package 554, and near bit orientation sensor 556 send data to the surface processor 514. The surface processor 514 demodulates and decodes the transmitted information in block 604, and in block 606 the surface processor 514 processes and analyzes the data against known algorithms and tables to determine various conditions downhole. The analysis determines a set of "actual" parameters specifying the downhole position and orientation of the bit 12.

The surface processor 514 preferably includes a set of objective parameters based upon a predetermined "well plan" that specifies the desired path of the borehole for the well. In block 608, the surface processor 514 compares the actual downhole parameters against the objective parameters. If the actual parameters are within the ranges for the objective parameters, meaning that the drill bit 12 is drilling along the desired well path, then no action is taken and the surface processor 514 returns to step 604. The well plan may be continuously updated as actual data, such as resistivity, gamma, and lithology measurements, are received from downhole.

If, for example, the comparison shows that the bit 12 is no longer drilling in the desired direction and that a change in drilling direction is warranted, the surface processor 514 sends commands downhole to change the direction of drilling in step 614. The surface processor 514 issues a command to the control modules of the bottom hole assembly 10 to compensate for the difference between the actual and objective parameters. For example, if the actual parameters indicate that the drilling is occurring outside the objectives of the well plan, the surface processor 514 determines a new angle and/or direction of drilling for the bit 12. A command is then sent downhole to steering assembly 20 to take corrective action. One or more of the three motors 174 are then moved to redirect the bit 12 to the new angle and/or direction. In any case, the surface processor 514 repeats the process beginning with block 604.

Once the new angle and direction are reached, the bit 12 drills further borehole for a short distance allowing the near bit orientation sensor 556 to determine whether the new position has been achieved and to provide a signal to the surface indicating same. After the change has been made, the surface processor 514 again compares the actual parameters to the objective parameters in block 612 to confirm the change. If the new position has not been achieved, additional commands are sent downhole again to further reposition the angle and direction of the tool face of the bit 12.

It should be appreciated that there may be manual intervention at the surface at any time to reposition the direction of drilling due to problematic conditions downhole while drilling in a particular direction such as when encountering extremely hard formations. It may turn out to be physically impossible to stay on the well path due to formation conditions. Further, it may be determined that even though the bit is drilling along the well path, it is not drilling in the preferred formation and thus a change in direction of drilling is preferred.

The steering assembly 20 of the present invention can be used as part of a bottom hole assembly below coil tubing or as part of bottom hole assembly 10 below a rotary drilling string that has a swivel joint and has the ability to have no or periodic rotation at the drilling motor 22. The power consumption to operate is small so that if necessary when using with a rotary drilling system a down hole turbine or battery could be used to power the steering assembly 20.

It should appreciated that other methods may be used such by mud pulse telemetry when used with rotary drilling system. The system can also be a closed loop system in that no commands are required from the surface for the steering assembly 20 to control and maintain the desired hole bore path.

This invention has various advantages over the prior art. It has the ability to control the amount of angle and direction of the bend and thus the inclination and azimuth without interrupting drilling. It has the ability to steer the bore hole direction in an oversized hole due to its ability to offset the bit 12 and change the direction of the bit 12 towards the direction being drilled. It has all of the above abilities in an assembly capable of drilling as small as a 3-¾ inch and larger bore hole. The bore hole will have a smooth transition from any direction changes required to steer the drilling because the correct amount of bend and offset required to obtain the It direction change can be used so that there are no excessive side loads and because the bore hole can be monitored as the hole is being drilled.

Although the preferred embodiment of the directional mechanism for actuating and controlling the change in bend angle and direction of the lower housing 28 with respect to the upper housing 26 of the steering assembly 20 has been shown and described, it should be appreciated that other apparatus and methods may be used for causing the lower housing 28 to bend and rotate on the universal joint 30 so as to change the direction of drilling of bit 12.

Figures 17, 18:
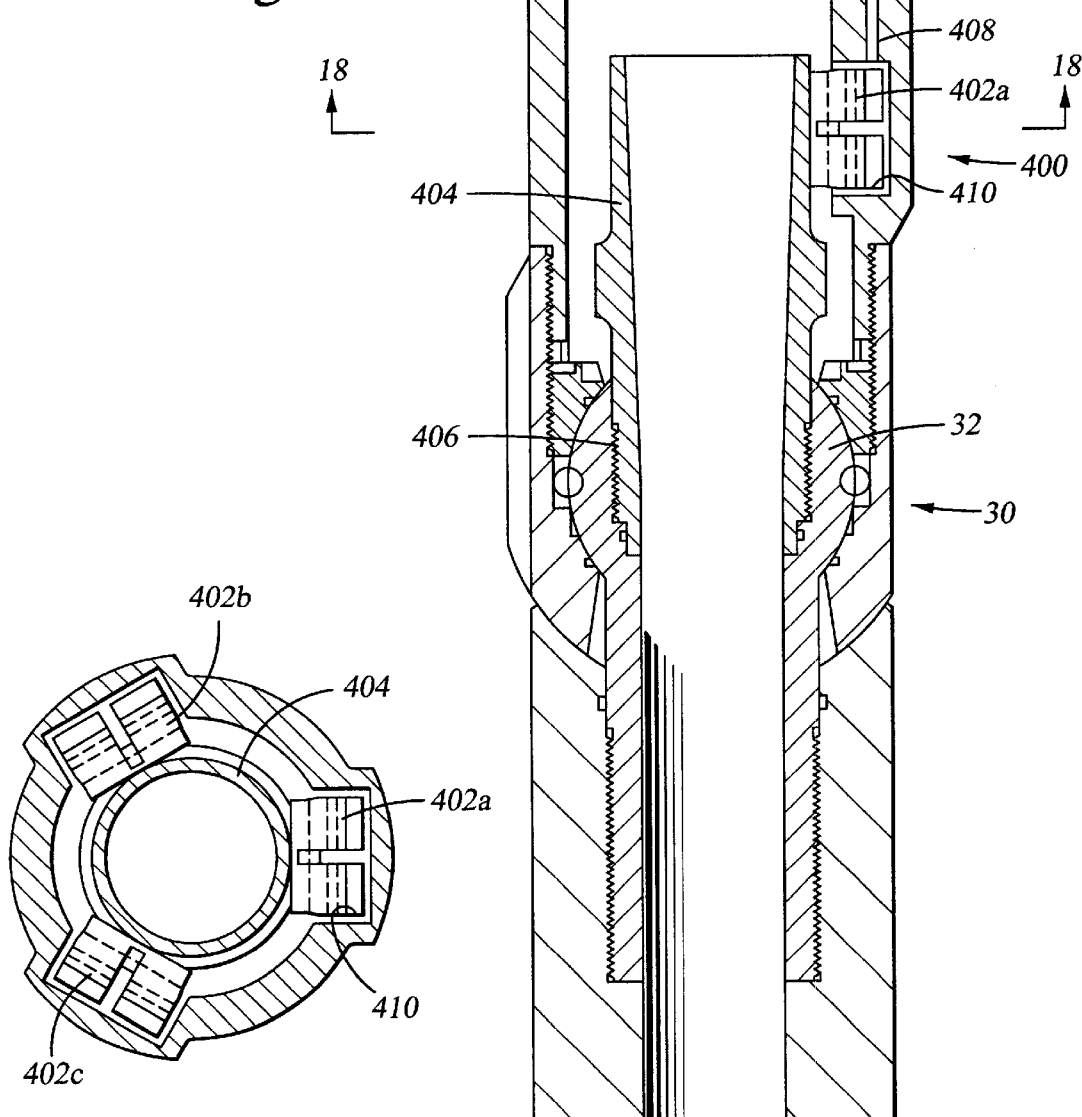
FIG. 17 is a cross-sectional view of an alternative apparatus for actuating and controlling the lower housing using hydraulic pistons.
FIG. 18 is a cross-sectional view of the actuating apparatus taken at section 18—18 in FIG. 17.
Figure 19:
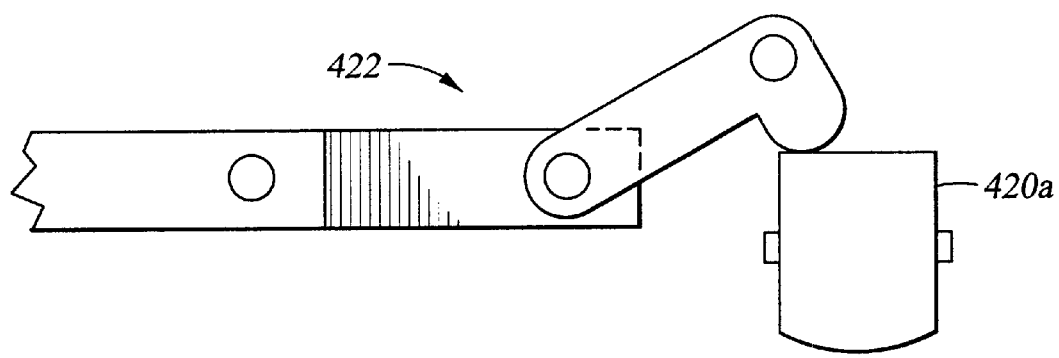
FIG. 19 is a side view of a another alternative apparatus for actuating and controlling the lower housing using mechanical leverage.
Figure 20:
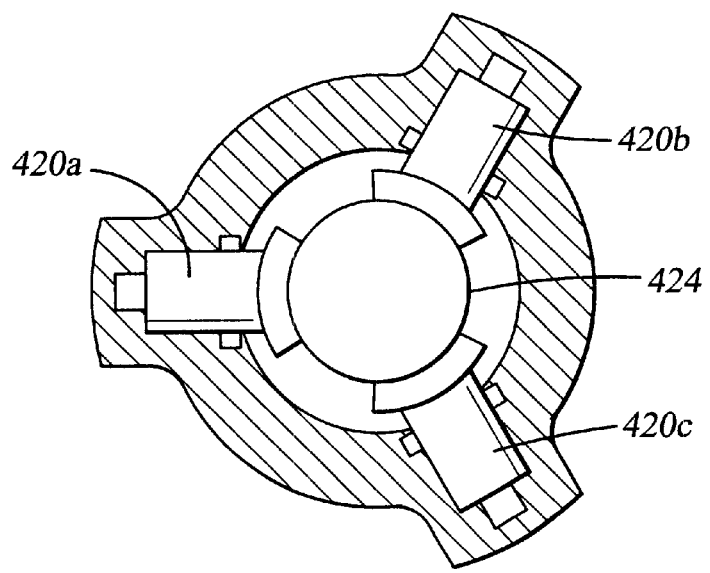
FIG. 20 is a cross-sectional view of the actuating apparatus of FIG. 19 taken at a plane similar to section 18—18 of FIG. 17.

Referring now to FIGS. 17 and 18, there is shown an alternative directional mechanism 400 including a plurality of pistons 402a, b and c engaging an extension member 404 threaded at 406 to knuckle ball 32. One or more hydraulic ports 408 communicate with pistons 402a–c causing them to reciprocate within a cylinder 410. The hydraulic actuation may be caused by electric motor 174 utilizing a drive mechanism such as shown in FIGS. 7 or 9. For example with respect to FIG. 7, large pistons 176 may act on hydraulic ports 408 or with respect to FIG. 9, a hydraulic pump, such as pump 252, may pump hydraulic fluid through hydraulic ports 408 to actuate pistons 402a–c. Alternatively, as shown in FIGS. 19 and 20, actuators 420a–c may be substituted for pistons 402a–c and actuated mechanically as shown in FIG. 19 by linkage 422 attached to one of the drive mechanisms described with respect to FIGS. 7, 8, or 9. Actuators 420 engage an extension member 424 threaded to knuckle ball 32. As pistons 402 or actuators 420 reciprocate in engagement with extension members 404 or 424, respectively, the extension members 404 or 424 cause lower housing 28 to shift the axis 72 of lower housing 28 with respect to the axis 74 of upper housing 26 to change the bend and/or direction of bit 12.

Figure 21:
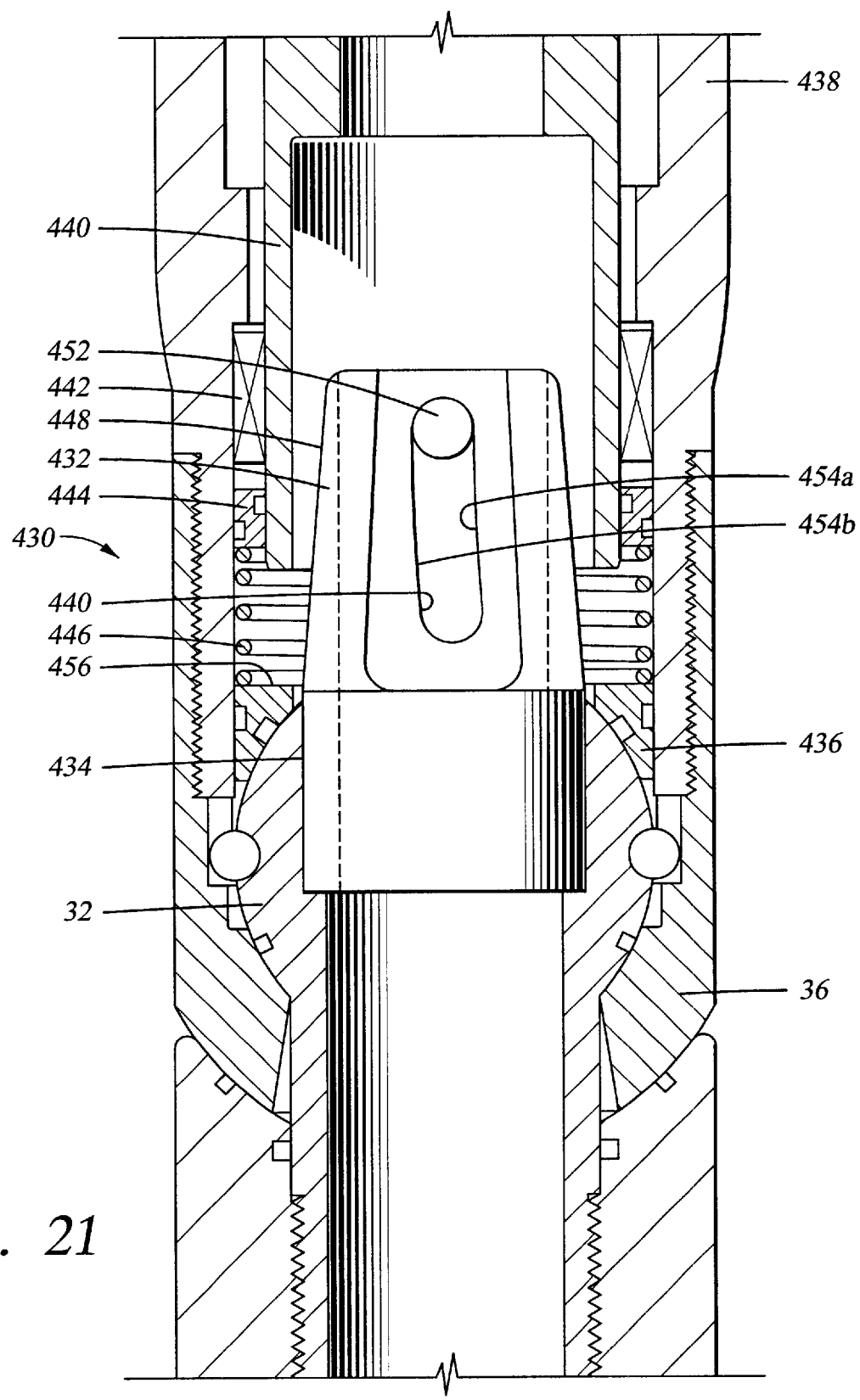
FIG. 21 is a cross-sectional view of a still further alternative apparatus for actuating and controlling the lower housing.

Referring now to FIG. 21, there is shown a still further alternative embodiment of the directional mechanism of the present invention. Directional mechanism 430 includes an extension member 432 rotatably attached at 434 to knuckle ball 32. Knuckle ball 32 is supported between knuckle joint housing 36 and a cage member 436 mounted on upper housing 438. Extension member 432 is mounted within knuckle ball 32 such that extension member 432 can rotate within knuckle ball 32. A locating cylinder 440 is mounted rotatably and reciprocably within upper housing 438 by means of bearings 442 and sealing retainer member 444. A spring 446 is disposed between cage member 436 and sealing retainer member 444 to bias locating cylinder 440 away from extension member 432. Locating cylinder 440 receives the upper tapered end 448 of extension member 432. Extension member 432 includes a plurality of cam slots 450 each of which receives a cam pin 452 mounted on locating cylinder 440. Cam slot 450 includes parallel cam surfaces 454a and b whereby as cam pin 442 moves within cam slot 450, extension member 440 pivots to change bend angle. Locating cylinder 440 is attached to an electric motor, such as motor 174, allowing locating cylinder 440 to be rotated. As locating cylinder 440 rotates, cam pin 452, within cam slot 450, causes extension member 432 to rotate thereby changing direction. In operation, when the pumps pumping drilling fluids from the surface are turned off, locating cylinder 440 moves axially upward due to spring 446 as shown in FIG. 21. When the pumps are turned on, the locating cylinder 440 moves downwardly against shoulder 456 of cage member 436.

Another alternative directional mechanism includes an eccentric preferably having a plurality of cam surfaces which is in engagement with the extension member of lower housing 28 and is rotated within the upper housing 26 causing the extension member to alter its bend angle and angular orientation with respect to the axis 74 of upper housing 26. It can be seen that such an eccentric may be rotated by an electric motor, much like electric motor 174 described in the preferred embodiment. As the eccentric is rotated, the axis 72 of lower housing 28 is shifted with respect to the axis 74 of upper housing 26. It can be seen that the lower housing 28 shifts on the universal joint 30 with respect to upper housing 28.

Another alternative directional mechanism includes two separate devices in the steering assembly for changing the bend angle and changing angular orientation one for changing the bend angle and another for changing angular orientation. A set of hydraulic valves and pistons engage the extension member to change the bend angle and a rotating member with bearing assembly and motor rotate the lower housing 28 with respect to the upper housing 26 to change orientation. The change in the bend angle and the change in angle orientation would be independent of each other.

It should be appreciated that many of the features of the present invention may be adapted for use with a steering assembly which engages the borehole wall for changing the bend angle and angular orientation of the lower housing 28 with respect to the upper housing 26. As previously discussed, such embodiments are less desirable due to the required drag on the borehole wall. One such apparatus and method includes the use valves and drilling fluid to extend adjustable blades in the housing of the steering assembly such that the lower housing 28 changes the bend angle and direction of axis 72 of lower housing 28 with respect to the axis 74 of upper housing 26.

A still another directional mechanism includes housing an eccentric center cam in the upper housing 26 of the steering assembly. The eccentric engages the driveshaft 14 within upper housing 26 and causes the driveshaft 14 to deflect as the cam on the eccentric is rotated within upper housing 26. As the driveshaft is deflected in upper housing 26, the down stream end of the driveshaft 14 engages lower housing 28 causing it to deflect with respect to upper housing 26. As lower housing 28 is deflected by driveshaft 14, the bend angle and angular orientation are changed to achieve a new angle and direction for drilling. This method is less desirable since a side load is applied to the driveshaft due to the cam on the eccentric member.

Still other embodiments of a steerable system are disclosed in U.S. provisional application Serial No. 60/063, 326, filed Oct. 27, 1997 entitled "Drilling System" and U.S. patent application Ser. No. 09/081,961 filed May 20, 1998 entitled "Drilling System", both hereby incorporated herein by reference and in U.S. patent application Ser. No. 09/353, 599 filed Jul. 14, 1999 entitled "Steerable Rotary Drilling Device and Directional Drilling Method", hereby incorporated herein by reference.

The preferred embodiment of the present invention has the advantages that it does not include external adjustable members engaging the borehole wall to create a drag during drilling nor does it apply side forces to the driveshaft causing driveshaft to transmit both side load and torque.

While a preferred embodiment of the invention has been shown and described, modifications thereof can be made by one skilled in the art without departing from the spirit of the invention.

What is claimed is:

1. An apparatus for steering a bit while drilling a borehole, comprising:
   a first housing connected to a second housing by a universal joint, said first housing having a first axis and said second housing having a second axis;
   a first cam member mounted on said first housing;
   a plurality of second cam members movably mounted on said second housing and engaging said first cam member; and
   said second cam members having a first position with respect to said first cam member forming a first angle and a first azimuth between said first and second axes and a second position with respect to said first cam member forming a second angle and a second azimuth with respect to said first cam member.

2. The apparatus of claim 1 wherein said universal joint includes a convex surface on said first housing pivotally engaging a concave surface on said second housing.

3. The apparatus of claim 2 further including bearings disposed between said convex and concave surfaces.

4. The apparatus of claim 1 further including arcuate surfaces on mating ends of said first and second housings.

5. The apparatus of claim 1 further including a bearing pack mounted on said first housing to support the bit.

6. The apparatus of claim 1 wherein said first cam member includes arcuate surfaces engaging tapered surfaces on said second cam members.

7. The apparatus of claim 6 wherein said tapered surfaces engage said arcuate surfaces over a contact area, the loci of contact areas as said tapered surfaces move over said arcuate surfaces forms substantially a line.

8. The apparatus of claim 6 wherein said tapered surfaces have an angle with a non-locking taper.

9. The apparatus of claim 8 wherein said tapered surfaces have an angle of substantially 15 degrees or more.

10. The apparatus of claim 1 wherein each of said second cam members engages said first cam member at a contact area, said contact areas forming a plane which is normal to said first axis whereby as said second cam members adjust the angle or azimuth of said plane, said plane shifts the angle or azimuth of said first axis.

11. The apparatus of claim 1 wherein there are at least three second cam members.

12. The apparatus of claim 1 further including a drive train connected to each said second cam member.

13. The apparatus of claim 12 wherein said drive train is connected to each said second cam member by a spring loaded connection.

14. The apparatus of claim 13 wherein said spring loaded connection includes an end of said drive train extending through an aperture in one end of said second cam member with a first set of springs disposed between said drive train and said one end of said second cam member and a second set of springs disposed between said second cam member and said end of said drive train.

15. The apparatus of claim 14 wherein said springs are Belleville springs.

16. The apparatus of claim 12 wherein said drive train includes a hydraulic amplifier for each said second cam member.

17. The apparatus of claim 16 wherein said hydraulic amplifier includes a large diameter piston connected to said second cam member and a small diameter piston in hydraulic communication with said large diameter piston.

18. The apparatus of claim 17 further including a drive mechanism to move said small piston.

19. The apparatus of claim 18 wherein said drive mechanism includes a power source associated with said small diameter piston to move said small diameter piston.

20. The apparatus of claim 19 wherein said power source includes an electric motor driving a mechanical amplifier connected to said small piston.

21. The apparatus of claim 20 wherein said mechanical amplifier includes a power screw, said power screw having an expandable/contractible member with one end connected to said electric motor and another end connected to a threaded member connected to said small piston, said threaded member threadingly engaging a threads disposed in said second housing.

22. The apparatus of claim 21 wherein said connections between said expandable/contractible member and said threaded member and between said threaded member and said small piston are double constant velocity joints.

23. The apparatus of claim 22 wherein said expandable/contractible member includes a first member connected to a second member by a sliding spline connection.

24. The apparatus of claim 19 wherein said power source includes a hydraulic motor connected to said small piston.

25. The apparatus of claim 17 wherein a closed hydraulic system is disposed between said small diameter piston and said large diameter piston.

26. The apparatus of claim 25 wherein said large diameter piston reciprocates in a first cylinder in communication with a second cylinder housing said small diameter piston, said closed hydraulic system including that portion of said first and second cylinders between said small diameter piston and said large diameter piston.

27. The apparatus of claim 12 wherein said drive train includes a mechanical amplifier connected to each said second cam member.

28. The apparatus of claim 27 wherein said mechanical amplifier includes a power screw driven by an electric motor.

29. The apparatus of claim 1 further including a sensor associated with each said second cam member to determine the position of each said second cam member.

30. The apparatus of claim 29 further including an electronics package programmed to determine bend angle and tool face based upon the position of said sensor.

31. The apparatus of claim 29 wherein said sensor includes a potentiometer connected to each said second cam member.

32. The apparatus of claim 31 further including a transmitter for transmitting signals generated by said potentiometers.

33. The apparatus of claim 1 wherein said first and second housings are connected by a turnbuckle connection.

34. The apparatus of claim 1 further including a drive shaft extending through a central bore in said housings with one or more centralizers disposed in said second housing and engaging said drive shaft.

35. The apparatus of claim 1 wherein said first cam member and said second cam members are disposed in a common fluid chamber.

36. The apparatus of claim 35 further including a pressure compensating system in fluid communication with said fluid chamber.

37. The apparatus of claim 36 wherein an isolation piston divides said fluid chamber.

38. The apparatus of claim 36 wherein said pressure compensating system includes a first fluid reservoir under pressure due to a first spring biased piston.

39. The apparatus of claim 38 further including a pressure relief system in fluid communication with said closed hydraulic system, said pressure relief system opening to allow fluid into a relief chamber by displacing fluid in said fluid chamber upon said fluid chamber reaching a predetermined pressure, said total volume of said fluid chamber and said relief chamber being closed from the outside.

40. The apparatus of claim 39 wherein said pressure relief system includes a valve opening at said predetermined pressure.

41. The apparatus of claim 39 wherein said pressure relief system includes a second fluid reservoir under pressure due to a second spring biased piston such that when pressure is reduced in said fluid chamber, fluid flows back into said fluid chamber so that the same volume of fluid returns to said fluid chamber.

42. The apparatus of claim 41 further including a check valve to relieve said second fluid reservoir upon reaching a predetermined pressure.

43. The apparatus of claim 1 further including an inclinometer disposed in said second housing.

* * * * *